United States Patent
Song

(10) Patent No.: US 9,185,523 B2
(45) Date of Patent: Nov. 10, 2015

(54) METHOD OF CORRECTING GLOBAL POSITION ERROR

(71) Applicant: Ha Yoon Song, Seoul (KR)

(72) Inventor: Ha Yoon Song, Seoul (KR)

( * ) Notice: Subject to any disclaimer, the term of this patent is extended or adjusted under 35 U.S.C. 154(b) by 0 days.

(21) Appl. No.: 14/312,764

(22) Filed: Jun. 24, 2014

(65) Prior Publication Data

US 2014/0378160 A1 Dec. 25, 2014

(30) Foreign Application Priority Data

Jun. 24, 2013 (KR) ........................ 10-2013-0072364

(51) Int. Cl.
*H04W 24/00* (2009.01)
*H04W 4/02* (2009.01)

(52) U.S. Cl.
CPC ..................... *H04W 4/023* (2013.01)

(58) Field of Classification Search
CPC ....... H04W 4/02; H04W 64/00; H04W 36/32; H04W 4/023; H04W 4/027
See application file for complete search history.

(56) References Cited

U.S. PATENT DOCUMENTS

| | | | |
|---|---|---|---|
| 2003/0128163 A1* | 7/2003 | Mizugaki et al. | 342/464 |
| 2007/0032248 A1* | 2/2007 | Ogino et al. | 455/456.1 |
| 2012/0295641 A1* | 11/2012 | Tsuda | 455/456.6 |
| 2013/0337834 A1* | 12/2013 | Alpert et al. | 455/456.1 |
| 2014/0365488 A1* | 12/2014 | Arslan et al. | 707/736 |

FOREIGN PATENT DOCUMENTS

| | | |
|---|---|---|
| JP | 2002-569959 | 3/2002 |
| JP | 2008-175788 | 7/2008 |
| KR | 1020050020171 | 3/2005 |
| KR | 1020090089343 | 8/2009 |

* cited by examiner

*Primary Examiner* — Ajit Patel
(74) *Attorney, Agent, or Firm* — Stuart H. Mayer; Mayer & Williams PC

(57) ABSTRACT

Provided is a method of processing information on a tuple comprising latitude, longitude, and a timestamp collected from a position information collection device. The method includes changing a significant level value for calculating the statistical value of the speeds of past tuples in order to determine whether the current tuple has an error.

8 Claims, 11 Drawing Sheets

METHOD OF CORRECTING GLOBAL POSITION ERROR

CROSS-REFERENCE TO RELATED APPLICATION

This application claims priority to Korean Patent Application No. 10-2013-0072364 filed on Jun. 24, 2013 and all the benefits accruing therefrom under 35 U.S.C. §119, the contents of which are incorporated by reference in their entirety.

BACKGROUND

The present disclosure relates to a method of determining whether there is an error in positional data collected by a user device, and a technology to correct the value of a position where there is an error.

People are apt to avoid selecting, as a destination, a place where they rarely visit. Regarding this matter, there are various research results for predicting a destination that people visit. In order to predict the movement of people, accurate positional data on them should be obtained. To this end, it is possible to use a well-known positional data system such as a GPS, a GLONASS or Galileo. Alternatively, it is possible to use wireless communication network positioning using a WiFi position approach as a mobile communication base station or a crowd source. Such methods may be implemented in a mobile user device. However, there may be an error in raw position data that is actually measured. There are many errors in position data in position data measured by a mobile user device that a specific manufacture manufactures. There is a need for filtering glaring errors and correcting a position determined as an error.

SUMMARY

According to an experiment, 12% or more of actually measured position data that is collected from an available smart phone, a cellular GPS device, a WiFi position detector for crowd sourcing, and a cellular network device has an error. Thus, there is a need to filter out erroneous position data. Furthermore, there is a need to simply correct erroneous position data. Also, position data being currently used includes many errors due to environmental factors. It is currently very fatal to a system that uses position data. Thus, there is a need to exactly find and calibrate such an error. Also, there is a need to detect a system disturbance at a specific time zone by acquiring the real-time error probability of a position acquiring system.

The present disclosure provides a method of solving such problems. Also, the present disclosure provides a method of implementing the method of solving such problems in real time so that the latter may be well performed by a user device having a limited capacity.

In order to solve such limitations, the present disclosure provides a position data error detection and calibration algorithm through a moving window mechanism. In this case, each position data node has the form <latitude, longitude, time>, the speed and acceleration between nodes are derived based on such data and an error is detected based on them. When a speed extraordinarily deviates from the current trend or acceleration has a value that may not appear in the real world may be said as erroneous data. To this end, it is possible to analyze the current trend by using a moving window concept. Also, it is possible to use a normal distribution useful for finding a value deviating from the current trend among many arbitrary distributions.

Also, when configuring a moving significant interval by using a moving average, reliability and a moving standard deviation, the present disclosure calculates the error probability of real data in real time and reflects the result to a reliability value so that more accurate error analysis is performed and an error rate is measured in real time.

In order to determine whether position data actually measured by a user device has an error, a method according to an aspect of the present disclosure may use a statistical mechanism that uses a calculated mean or expectation and a standard deviation for an actually measured speed. Also, it is possible to use a mechanism of using an actually measured acceleration value.

In addition, a method of correcting a position value determined as erroneous according to an aspect of the present disclosure may use a statistical mechanism that is based on a difference calculated on an actually measured position value.

The wording "actually measured" in the present disclosure may mean acquiring information on a position, a speed and acceleration directly from a user device that does not use a method of filtering position data and a method of correcting position data according to the present disclosure.

It is possible to obtain the actually measured values of a speed and acceleration from moving position data that has the form <latitude, longitude, time> actually measured from a user device. In the following, moving position data having the form <latitude, longitude, time> may be referred to as "tuple" or "position data tuple".

In the present disclosure, it is possible to calculate the statistics of a position and a speed by using data selected by a moving window (or a sliding window) and it is possible to repetitively update these values. In addition, it is possible to perform a filtering operation on actually measured position data by using a controllable parameter. Since an algorithm according to an embodiment of the present disclosure is simple, the present disclosure may also be applied to a mobile user device that has little computing power.

In an embodiment of the present disclosure, it is possible to optimize the size of a moving window for the enhancement of performance. Also, a backtracking interpolation method may be used to replace a speed value and/or position value determined as erroneous with an appropriate estimation value.

It may be considered that a speed does not sharply increase to a certain level, and thus when it is possible to know the mean and standard deviation of a speed at a time interval, it is possible to set a significant interval conforming to e.g., a normal distribution and determine a speed exceeding the significant interval as an error value.

A method of processing position information according to an aspect of the present disclosure processes information on a tuple including latitude, longitude, and a timestamp collected from a position information collection device. In this case, the method includes determining that there is an error in tuple [i] in a timestamp [i] when the current speed Vi in the timestamp [i] is larger than a statistic value calculated from past speeds included in a window including a timestamp [i−1]; and replacing information on the tuple [i] with an estimation value when it is determined that there is the error. In this case, the replacing may be performed at the timestamp directly after the timestamp at which the determining is performed.

In this case, the statistic may be a moving confidence interval obtained from past speeds. In particular, the moving confidence interval may be a value obtained by adding the mean $MA_{speed}$ of past speeds to a first value $s \times MSD_{speed}$ proportional to the standard deviation of the past speeds.

In this case, the processing method may further include, before calculating the estimation value, determining that there is an error in a speed [i+1] when the speed [i+1] at a timestamp [i+1] is larger than a second statistic calculated from past speeds included in a window including a timestamp [i−n+1] to a timestamp [i]; and, before the estimating, pre-replacing the speed [i+1] with the second statistic when it is determined that there is an error in the speed [i+1]. In this case, the second statistic may be $MA_{speed}+s_{99.5} \times MSD_{speed}$. In this case, $s_{99.5}$ means a confidence interval but other parameters meaning a confidence interval having a range different therefrom, such as 599.9 meaning a confidence interval of 99.9% may also be used.

Also, the processing method may further include determining whether there is an error in a tuple [i−] at the timestamp [i−1]; calculating the above-described statistic when there is no error in acceleration in the tuple [i−1] and there is an error in speed in the tuple [i−1] and determining whether a speed value actually measured at the timestamp [i−1] is smaller than the above-described statistic; and replacing a speed, a latitude, and a longitude at the timestamp [i−1] with values actually measured at the time stamp [i−1] when the actually measured speed value is smaller than the above-described statistic. In this case, n above is the size of a window.

The method of processing position information according to another aspect of the present disclosure includes changing a significant level value for calculating the statistic of the speed of past tuples in order to determine whether there is an error in the current tuple. In this case, the statistic may be a moving confidence interval obtained from the speed of the past tuples. Also, the statistic is a value calculated by the mean of the speeds of the past tuples, the standard deviation value of the speeds of the past tuples and a significant level value. The significant level value may be throttled by the error rate of collected tuples.

Changing the significant level value includes increasing the significant level value when the error rate of collected data is lower than the error probability of the significant level value; and decreasing the significant level value when the error rate is higher than the error probability of the significant level value. In this case, only when the number of pieces of data collected so far exceeds a minimum sample size, the significant level value changes. In this case, when the significant level value changes, one or more of the minimum sample size and the next minimum sample size changes based on a changed significant level value.

A method of estimating position information according to another aspect of the present disclosure may further determining that there is an error in the current tuple when the speed of the current tuple is larger than a statistic calculated from the speeds of the past tuples. In this case, the method may further include replacing information on the current tuple with an estimation value when it is determined that there is an error in the current tuple; and increasing Ecount value. In this case, the estimation value may be a value that is linearly interpolated by using the speeds of two or more different tuples excluding the current tuple.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
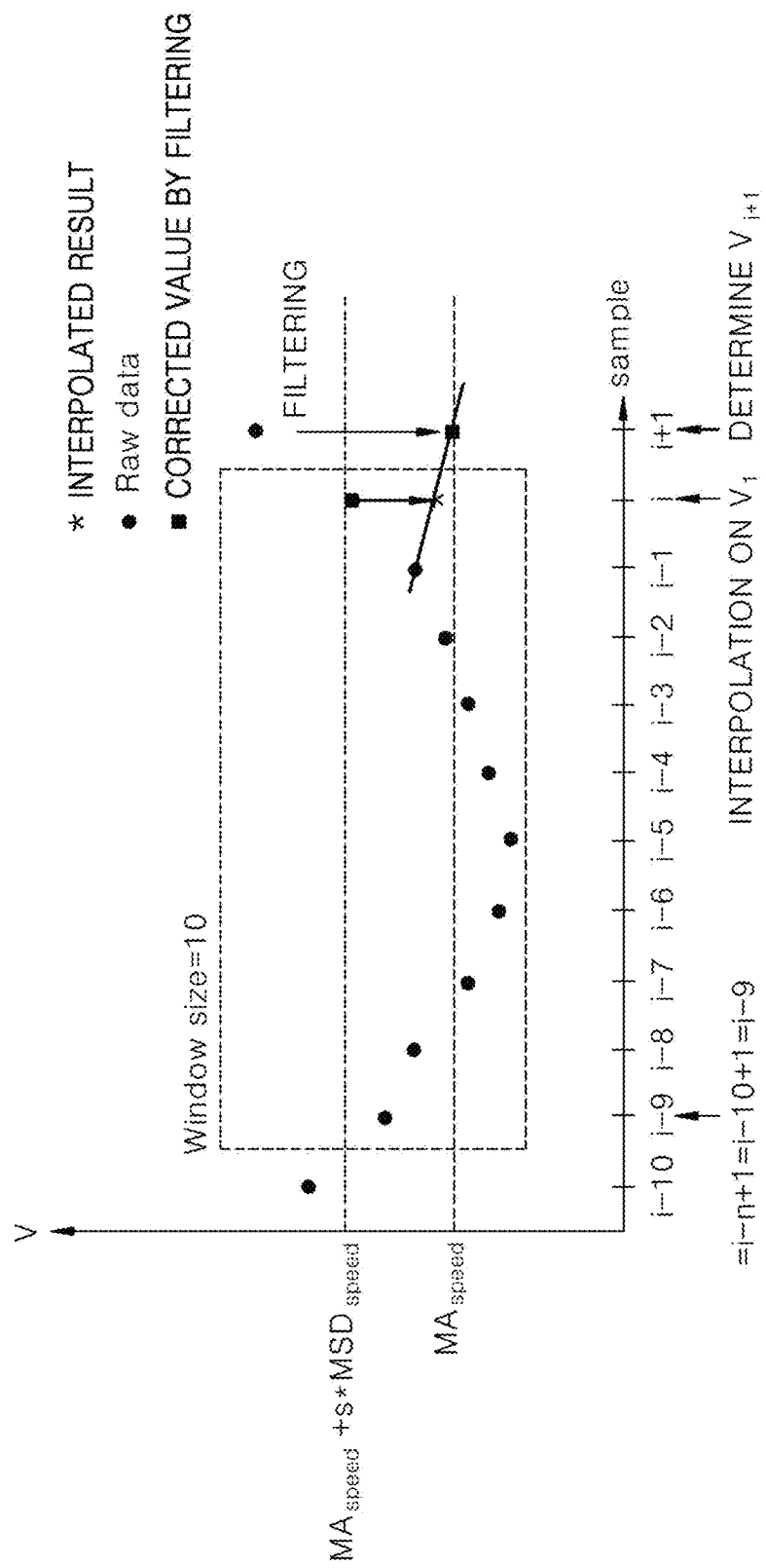
FIG. 1 explains a speed calibration algorithm according to an embodiment of the present disclosure.

Embodiments of the present disclosure are described below with reference to the accompanying drawings. However, the present disclosure is not limited to embodiments described herein and may be implemented in different forms. The terms used herein are intended to help readers understand embodiments and are not intended to limit the scope of the present disclosure. Also, singular forms used herein also include plural forms unless representing a clear objection thereto.

It is possible to use a set of tuple (i.e., a moving data tuple) actually measured and collected in the form of <latitude, longitude, time> to represent a user's moving trajectory (trace). It is possible to obtain a set of data representing user's mobility by combining an identification parameter capable of identifying each tuple with the tuple. In the present disclosure, it is possible to refer to a tuple obtained at a time t as $P_t$, and latitude and longitude provided by $P_t$ as $lat_t$ and $lon_t$, respectively.

By using the contents disclosed in reference [1] cited below, it is possible to calculate a moving distance Di and a speed Vi and acceleration a, at a time $t_i$ by using two consecutive tuples $<lat_{i-1}, lon_{i-1}>$ and $<lat_i, lon_i>$. Therefore, the tuple $P_t$ may have a core form such as $<t, lat_t, lon_t, D_t, V_t, a_t>$ including additional attributes. The attributes $t, lat_t, lon_t, D_t, V_t, a_t$ may be referred to as actually measured values in the present disclosure.

Reference [1]: T. Vincenty, "Direct and Inverse Solutions of Geodesics on the ellipsoid with Application of Nested Equations," Survey Review, Volume 23, Number 176, April 1975, pp. 88-93(6).

Table 1 represents, through a research, general maximum speeds that may be represented depending on a transportation method. For example, the maximum speed $MAX_{speed}$ to be applied to an embodiment of the present disclosure may be defined as 250 m/s. Also, the maximum value of acceleration considered to be available in a usual environment is defined and may be indicated by $MAX_{acceleration}$. When an actually measured speed or acceleration is larger than the $MAX_{speed}$ or $MAX_{acceleration}$, it may be determined that there is an error.

TABLE 1

| Transportation Method | Maximum speed (m/sec) |
| --- | --- |
| Ambulation | 3.00 |
| Bicycle | 33.33 |

TABLE 1-continued

| Transportation Method | Maximum speed (m/sec) |
| --- | --- |
| Automobile | 92.78 |
| Sports-Car | 244.44 |
| High-Speed Train | 159.67 |
| Air-plain | 528.00 |

Then, it is possible to calculate a moving average of speed actually measured or stored and it is possible to calculate a moving standard deviation of speed.

The moving average of speed and the moving standard deviation of speed at any time t may be indicated by $MA_{speed}(n)$ and $MSD_{speed}(n)$, respectively. In this example, n represents the number of past data of $\{P_x : t-n+1 \leq x \leq t\}$ that is a set of tuples. In this case, past n data may be obtained by applying a window having a size of "n".

Once a new tuple $P_t$ is obtained, it may be checked whether $V_t$ and at calculated from the tuple $P_t$ may be accepted in a usual environment. When a calculated $V_t$ is out of a normal distribution conforming to the moving average of speed $MA_{speed}(n)$ and the moving standard deviation of speed $MSD_{speed}(n)$, the tuple $P_t$ may be filtered out (i.e., removed) from a series of traces. A condition for removing the $P_t$ may be given by Equation 1:

$$V_t > MA_{speed}(n) + s \cdot MSD_{speed}(n). \qquad <\text{Equation 1}>$$

In Equation 1, "s" represents the sensitivity of filtering and is a parameter that may be controlled by a user.

If $V_t$ does not satisfy Equation 1, it may be determined that a new tuple $P_t$ has an effective value and it is possible to update the values of $MA_{speed}(n)$ and $MSD_{speed}(n)$ by using the new value. Since the calculation is relatively simple, it may be performed in real time by a low power device such as a mobile user device.

Depending on the size n of the above-described window, a filtering characteristic may vary. Thus, it is possible to collect a value actually measured by an available mobile user device in order to perform an experiment for examining an effect depending on the size of a window. A user device may store and output position data whenever sensing a change in position. Alternatively, when the user device is in a static state, it is possible to store and output position data at a user-defined interval such as every three seconds to sixty seconds. It is possible to represent position data acquired by using the method above on a map by using various mechanisms.

According to an experiment for the present disclosure, an available user device often provides position data obtained by using three different techniques, together. That is, a position using a cellular base station, a position using a WiFi device for a crowd source and a position using a GPS are provided together. In some cases, the values of three types of position data provided at the same time represent different values. When a plurality of position data is obtained together, there is a high possibility according to an experience that position data having the minimum speed value is effective. Therefore, at a first step of filtering position data, a technique of selecting position data having the shortest moving distance from the previous position among a plurality of position data provided by different techniques at the same time may be selected.

In order to determine the optimal value of the size n of a window applied to an algorithm used for filtering position data, various experiments are performed changing the size n.

When the size of the window is large, it may be expected that the algorithm may successfully cope with continuous errors in a static state but will fail to respond to them when a speed quickly changes.

On the contrary, when the size of the window is small, the algorithm will show a quick response with respect to a sudden change in speed in a moving state considered as including continuous error tuples. However, when there are m continuous errors, it is impossible to filter the errors when m>n, i.e., the size of the window is small.

To confirm such a matter, various experiments are performed on a set of data actually measured, changing the size n of the window. In each experiment, n is set to 5, 10, 25, 50 or 100 and the moving average of speed and the moving standard deviation of speed are calculated for each case.

As the size of the window increases, the effect of an error is maintained for a longer time when data having a big error in an actually measured speed value is input. As a result, under filtering on erroneous data occurs. When the size of the window is 100 or 50, it is confirmed that there is a tailing effect.

On the contrary, when the size of the window is small, a reaction is performed quickly and sensitively on a change in speed, especially at the step that the speed starts changing. However, there is a tendency of over-filtering and removal of accurate data. When the size of the window is small such as 5 or 10, there are cases where two or more tuples appearing to be accurate speed data are removed.

Through the above matter, it may be seen that there is a need to introduce a throttling mechanism for a moving window in order to avoid a tailing effect depending on the size of the window.

A pre-experiment for examining an error in actually measured position data is described below.

In the pre-experiment, position data is collected for several hours while position detectors are fixed indoors and outdoors. A first position detector is an available Garmin GPSMAP62s and only used for GPS data collection. A second position detector is an available Samsung Galaxy Tab and used for obtaining position detection data from a 3G base station (3GBS) connected to the device. It is estimated that position data obtained by using the 3GBS has more errors and that position data obtained from the GPS and the 3GBS all has errors. Especially, it is estimated that there is also a position detection error indoors. The result of the pre-experiment is represented in Table 2. Table 2 represents errors that are represented when actually measuring position data, and is m in unit.

TABLE 2

| Building | 3G Base Station | | GPS | |
| --- | --- | --- | --- | --- |
| Inside | n(Data Point) | 893 | n(Data Point) | 2186 |
|  | n(Error Point) | 434 | n(Error Point) | 939 |
|  | Error Rate | 48.6% | Error Rate | 43.0% |
|  | E[Error Dist] | 52.5530 m | E[Error Dist] | 43.5506 m |
|  | Max(Error Dist) | 156.7578 m | Max(Error Dist) | 10769.72 m |
|  | $\sigma_{ErrorDist}$ | 32.6859 m | $\sigma_{ErrorDist}$ | 370.6034 m |
| Outside | n(Data Point) | 331 | n(Data Point) | 1690 |
|  | n(Error Point) | 122 | n(Error Point) | 208 |
|  | Error Rate | 36.9% | Error Rate | 12.3% |
|  | E[Error Dist] | 52.6618 m | E[Error Dist] | 4.4498 m |
|  | Max(Error Dist) | 206.3526 m | Max(Error Dist) | 51.7789 m |
|  | $\sigma_{ErrorDist}$ | 23.5953 m | $\sigma_{ErrorDist}$ | 7.1696 m |

Error distances are calculated from position data and it is possible to calculate the variance and mean of the error distances. As estimated, the 3GBS represents a larger error rate and a larger error, the maximum its error size is also larger and the standard deviation of its error size is also larger. Garmin GPSMAP62s should calculate a user's position based on past speeds even if a GPS signal is lost, and thus a very large error is also represented indoors. Thus, it may be considered that indoor GPS data is not meaningful. Outdoor GPS data represents accuracy sufficient to obtain accurate position data and its maximum error size also is within a reasonable range of 52 m.

A filtering algorithm according to an embodiment of the present disclosure is described below. [Algorithm 1] in Table 3 is used to determine whether there is an error in actually measured position data and filter erroneous position data. When new position data $P_{i+1}$ is acquired, [Algorithm 1] may determine whether to filter $P_{i+1}$.

TABLE 3

Algorithm 1: Position Error Detection by Moving Window

Require: $P_0$ // At least one initial tuple is required
Require: window size n
Require: user sensitivity level s
Ensure: Check validness of new position tuple
Ensure: Calibrated series of tuple $\{P_1 : t \geq i > 0 \}$ for t inputs
Require: i=0
 1: repeat
 2:   Get $P_{i+1}$ // Acquisition of new tuple, if exist
 3:   Construct $MA_{speed}(n)$ with $\{P_x : \max(i - n + 1, 0) \leq x \leq 1\}$
 4:   Construct $MSD_{speed}(n)$ with $\{P_x : \max(i - n + 1, 0) \leq x \leq 1\}$
 5:   Set $MA_{speed} = MA_{speed}(n)$
 6:   Set $MSD_{speed} = MSD_{speed}(n)$ // Moving Window Construction
 7:   Set $V_{i+1} = (dist(P_{i+1}, P_i))/(t_{i+1} - t_i)$
 8:   if $((V_{i+1} > MA_{speed} + s * MSD_{speed})$ or $(a_{i+1} \geq MAX_{acceleration}))$ and $(V_{i+1} > MIN_{speed})$ then
 9:     Mark $P_{i+1}$ as filtered. // Filtering
10:   end if
11:   if $(V_{i+1} \geq MA_{speed} + s_{99.5} * MSD_{speed})$ and $(V_{i+1} > MIN_{speed})$ then
12:     Set $V_{i+1} = MA_{speed} + s_{99.5} * MSD_{speed}$ // Calibration of Speed
13:   end if
14:   if $a_{i+1} \geq MAX_{acceleration}$ then
15:     Mark $P_{i+1}$ as filtered
16:     Set $V_{i+1} = MA_{speed}$
17:     Set $a_{i+1} = MAX_{acceleration}$ // Restriction by Maximum Acceleration
18:   end if
19:   Set i = i + 1
20: until Exist no more input of positioning tuple The functions of each part of [Algorithm 1] in Table 3 are described below.

Third to Sixth Lines of [Algorithm 1]: When there are less than n tuples, it is impossible to provide data sufficient to fill a window having a size n. Instead, it is possible to configure an incomplete window by using little information.

Eighth to Tenth Lines of [Algorithm 1]: Acceleration and a speed may be used as parameters for filtering and used by using different techniques but may all be considered as throttling parameters. Tuples that are out of a range of a so-called moving significant interval expressed by $MA_{speed}+s*MSD_{speed}$ that represents velocity $V_{i+1}$ or have too high acceleration are filtered. In this example, s represents the significant level of a normal distribution.

Eleventh to Thirteenth Lines of [Algorithm 1]: When the velocity of a tuple is too high, it affects values $MA_{speed}$ and $MSD_{speed}$ and thus a filtering error such as an expansion of a confidence interval occurs. As a result, tuples that are needed to be filtered out are filtered in. As such, when the velocity of a tuple is too high, it is possible to modify a velocity value by using $MA_{speed}(n)+s_{99.5}*MSD_{speed}=MA_{speed}(n)+2.57*MSD_{speed}$, in order to include a quick change in speed as possible and avoid the expansion error of a confidence interval.

$s_{99.5}$ on Eleventh to Thirteenth Lines of [Algorithm 1]: $s_{99.5}=2.57$ represents a confidence interval of 99.5% in a normal distribution. This is a throttling parameter that reduces the effect of an erroneous speed on a moving window.

Twelfth Line of [Algorithm 1]: Even if any tuple is needed to be filtered out by Equation 1, it is possible to include the speed of this tuple through restriction or calibration to be within a confidence interval of 99.5% in a normal distribution in order to reflect the speed of this tuple to a moving window. The reason is so that a moving window is updated including a quick speed value in order to cope with a quick change in speed. That is, an error-less tuple may also be filtered out if having a sharp change in speed. In such a case, even if the tuple is filtered, a moving window may reflect a maximum change in speed that may be allowed for the tuple.

$MIN_{velocity}$ on Twelfth Line of [Algorithm 1]: Since a human being may walk at 2.77 m/s (10 Km/h) or lower speed and is within a GPS error range, 2.77 m/s (10 Km/h) or lower speed is not filtered out.

$MAX_{acceleration}$ on Fourteenth Line of [Algorithm 1]: Tuples having impractical acceleration are filtered out.

Twelfth to Sixteenth Lines of [Algorithm 1]: Tuples having excessive acceleration are filtered out, the acceleration values of the tuples are calibrated to $MAX_{acceleration}$, their speed values are calibrated to $MA_{speed}(n)$ in order to nullify the effect of impractical speed values.

Since a vehicle may always stop quickly with great negative acceleration, tuples having negative acceleration values are considered as being effective without errors. On the contrary, tuples having positive acceleration values greater than $MAX_{acceleration}$ are considered as being erroneous.

Two variables n and s in [Algorithm] may be set by a user. The variable n is the number of tuples in a window, i.e., a window size, and the variable s is the sensitivity level of filtering (i.e., a significant level of a normal distribution). The user sensitivity level s may be relatively simply determined. It is possible to obtain s having an appropriate confidence interval from the characteristic of a normal distribution. Since only the positive area of a normal distribution is used for filtering, s may be set to 1.64 for a 95% confidence interval, and s may be set to 2.33 for a 99% confidence interval. Users may determine s according to their purposes. For example, the sensitivity level s may be selected as follows. Table 2 shows a normal error rate for position data collection when a device does not move. In the case of GPS, 12.3% of position data has errors, and in the case of a 3GBS cellular position detection system, 36.75% of position data has errors. Thus, in this case, s may be set to 1.16 for GPS data and s may be set to 0.34 for cellular position detection data.

As described above, when the size of a window is large, a trailing effect occurs and thus it is possible to decrease the size of the window in order to avoid the effect. An inaccurate speed value may be calibrated by [Algorithm 1], an abnormal acceleration value may be limited, and a speed value may be replaced with an average speed calculated by a moving window. Several experiments are performed in order to examine the effect of a window size depending on such a calibration mechanism. In a first experiment, a window size n is selected as 5, 10, 25, 50 and 100, the sensitivity level s is selected as 1.16, and filtering is performed on the assumption that 88% of actually measured position data is accurate data. When the window size is small, a trailing effect is limited but a result representing a more flexible reaction according to a change in speed is obtained. In the first experiment, when the size of the window is 5 or 10, a good result is obtained.

In a second experiment, the effect of continuous errors is considered. The continuous errors may affect a moving average and a moving standard deviation used in the present algorithm. There are up to four continuous errors in a set of position detection data used in an actual experiment. Thus, in the second experiment, it is concluded that n=5 is not sufficient for correcting consecutive errors, and that the consecutive errors can be properly corrected when the window size n is set equal to 10 (n=10), and that, with window size n=10, tailing effect which occurs with a window size n larger than 10 can be reduced. Thus, in the experiment, the window size is eventually determined as 10. When experiencing more continuous errors, it is possible to select a window size suitable therefor or dynamically increase the window size.

As a result of various experiments using [Algorithm 1] according to the present invention, it is possible to obtain two conclusions. Firstly, when the window size and the sensitivity level are appropriately selected, it is possible to obtain an appropriate filtering result. Secondly, according to many combinations of the window size and the sensitivity level, it is possible to perform filtering on all sets of position detection data.

Table 4 represents the percentage of filtered-out tuples for combinations of parameters. A user of an algorithm according to an embodiment of the present invention may select a window size and a sensitivity level according to Table 4 according to his or her environment. In [Algorithm 1], various parameters of the algorithm such as a window size, a sensitivity level, a maximum speed and maximum acceleration may be defined by a user. The user may also change the constants of the algorithm such as $MAX_{acceleration}$, a maximum sensitivity level $s_{99.5}$, and minimum threshold value of speed for filtering $MIN_{velocity}$.

TABLE 4

| Size of Sliding Window | s = 0.34 | s = 1.16 | s = 1.64 | s = 2.33 |
|---|---|---|---|---|
| 5 | 42.20 | 29.07 | 24.06 | 19.31 |
| 10 | 38.67 | 24.10 | 18.81 | 14.31 |
| 25 | 37.37 | 21.43 | 16.07 | 11.85 |
| 50 | 37.71 | 20.54 | 15.23 | 11.07 |
| 100 | 37.05 | 20.03 | 14.90 | 10.65 |

[Algorithm 1] may vary in consideration of the flowing matters.

Firstly, it is possible to define the size of a window as a time interval including the window instead of defining the window size as the number of tuples in a window. When considering that a speed is a function of a time, it may be seen that a varied technique is effective and accurate when regularly collecting position data.

Secondly, it is possible to dynamically calibrate the window size. In another embodiment that is a variation to [Algorithm 1], it is possible to dynamically increase or decrease the window size according to the number of continuous errors. Once it is found that the number of continuous errors is large, it is possible to increase the window size in order to minimize an effect on a moving average and a moving standard deviation by continuous errors. When the number of continuous errors is small, it is possible to show an appropriate reaction to a rapid change in speed and to decrease calculation for filtering by decreasing the window size.

Thirdly, it is possible to change [Algorithm 1] to a pseudo real-time algorithm, not a real-time algorithm. For the window size n, it is possible to filter a $$\left[\frac{n}{2}\right]$$

th tuple that is approximately in the middle of a window instead of filtering a (n+1)th tuple. This method may decrease under filtering and over filtering tendencies even though it may not be implemented completely in real time.

Fourthly, it is possible to an interpolation mechanism to [Algorithm 1]. [Algorithm 2] presented in Table 5 below is obtained by adding an interpolation step to [Algorithm 1] (see lines 18 to 21 of [Algorithm 2]). When a new tuple (index i+1) is acquired, it is possible to replace the speed of the last tuple with an interpolated value when it is confirmed that the last tuple (index i) in the currently existing window is filtered out. When such interpolation is used, it is possible to more precisely provide a moving window introduced for the filtering of a tuple (see lines 18 to 21 of [Algorithm 2]). That is, by the last part of [Algorithm 2], it is possible to interpolate the last tuple marked as filtered out in a window whenever a new tuple is acquired. In another variation for configuring a moving window for more precise approximation, a $$\left[\frac{n}{2}\right]$$

the tuple approximately in the middle of a window is interpolated by using n tuples in the window. For more precise estimation, more precise interpolation may be enabled by interpolating the middle tuple in a window by using an asymptotic curve estimated from n tuples. However, since computational overhead may occur due to that, it may be difficult to apply it to a mobile user device.

TABLE 5

Algorithm 2: Estimation of Speed for Stabilization of Moving Window

Require: $P_0$ // At least one initial tuple is required
Require: window size n
Require: user sensitivity level s
Ensure: Check validness of new position tuple
Ensure: Calibrated series of tuple $\{P_1 : t \geq i > 0\}$ for t inputs
Require: i=0
1:  repeat
2:      Get $P_{i+1}$ // Acquisition of new tuple, if exist
3:      Construct $MA_{speed}(n)$ with $\{P_x : \max(i - n + 1, 0) \leq x \leq i\}$
4:      Construct $MSD_{speed}(n)$ with $\{P_x : \max(i - n + 1, 0) \leq x \leq i\}$
5:      Set $MA_{speed} = MA_{speed}(n)$
6:      Set $MSD_{speed} = MSD_{speed}(n)$ // Moving Window Construction
7:      if $((V_{i+1} > MA_{speed} + s * MSD_{speed})$ or $(a_{i+1} \geq MAX_{acceleration}))$ and $(V_{i+1} > MIN_{speed})$ then
8:          Mark $P_{i+1}$ as filtered. // Filtering
9:      end if
10:     if $(V_{i+1} \geq MA_{speed} + s_{99.5} * MSD_{speed})$ AND $(V_{i+1} > MIN_{speed})$ then
11:         Set $V_{i+1} = MA_{speed} + s_{99.5} * MSD_{speed}$ // Calibration of Speed
12:     end if
13:     if $a_{i+1} \geq MAX_{acceleration}$ then
14:         Mark $P_{i+1}$ as filtered
15:         Set $V_{i+1} = MA_{speed}$
16:         Set $a_{i+1} = MAX_{acceleration}$ // Restriction by Maximum Acceleration
17:     end if
18:     if ($P_i$ marked as filtered) then
19:         Set $V_i = ((V_{i+1} - V_{i-1}) * (t_i - t_{i-1}))/(t_{i+1} - t_{i-1}) + V_{i+1}$
20:         Mark $P_i$ as interpolated // Linear interpolation
21:     end if
22:     Set i = i + 1
23: until Exist no more input of positioning tuple FIG. 1 explains a speed correction algorithm according to an embodiment of the present invention.

The horizontal axis of FIG. 1 represents the indexes (i.e., timestamps) of tuples continuously obtained and the vertical axis of FIG. 1 is the speed of each tuple stored in a memory. FIG. 1 illustrates that the size n of a moving window is 10. It is possible to calculate "$MA_{speed}$" and "$MA_{speed}+s_{99.5} \times MSD_{speed}$" from 10 speeds present in a moving window and examples of the values are shown in FIG. 1. In FIG. 1, it is assumed that the acceleration $a_{i+1}$ at an index [i+1] is higher than $MAX_{acceleration}$. Thus, the speed $V_{i+1}$ at the index [i+1] is corrected to $MA_{speed}$ (see line 15 of [Algorithm 2]). In FIG. 1, it is assumed that a moving data tuple $P_i$ for an index [i] is marked as filtered already out according to [Algorithm 2] (see line 18 of [Algorithm 2]). The filtering out of any tuple means that a determination that there is an error where the tuple has is made, but a speed or acceleration calculated from the tuple may still be stored. Thus, according to line 19 of [Algorithm 2], the speed $V_i$ of a moving data tuple $P_i$ is replaced with a value linearly interpolated by using the speed $V_{i-1}$ of a moving data tuple $P_{i-1}$ and speed $V_{i+1}$ of a moving data tuple $P_{i+1}$. As such, according to [Algorithm 2], the speed of a newly acquired tuple may be first calibrated by lines 10 to 17 of [Algorithm 2], and then a calibrated speed may be further calibrated by lines 18 to 21 of [Algorithm 2] when another new tuple is acquired. It may be understood that both the first calibration and the further calibration as described above may be performed on the speed of any tuple, or only one of both calibrations or no calibrations may be performed thereon.

A value obtained by interpolating and calibrating the speed $V_i$ of the above-described tuple $P_i$ is usually smaller than a value "$MA_{speed}+s_{99.5} \times MSD_{speed}$" calibrated by the line 11 of [Algorithm 2] but may also be larger depending on a calibrated value or moving significance interval at the next timestamp.

Processing on a newly acquired moving data tuple $P_{i+1}$ and the latest moving data tuple $P_i$ present in a moving window are performed through [Algorithm 2]. Alternatively, in another embodiment of the present disclosure, processing on a moving data tuple $P_m$ at any timestamp in a moving window may be performed. To this end, lines 18 to 21 of [Algorithm 2] may vary as represented in Table 6.

TABLE 6

| 17: | if ($P_m$ marked as filtered) then // Linear Interpolation |
| 18: | Set $V_m = ((V_{m+1} - V_{m-1}) * (t_m - t_{m-1}))/(t_{m+1} - t_{m-1}) + V_{m-1}$ |
| 19: | Mark $P_m$ as interpolated |
| 20: | end if |

Where m = i − k and k is a parameter that may be throttled by a user.

Figure 2:
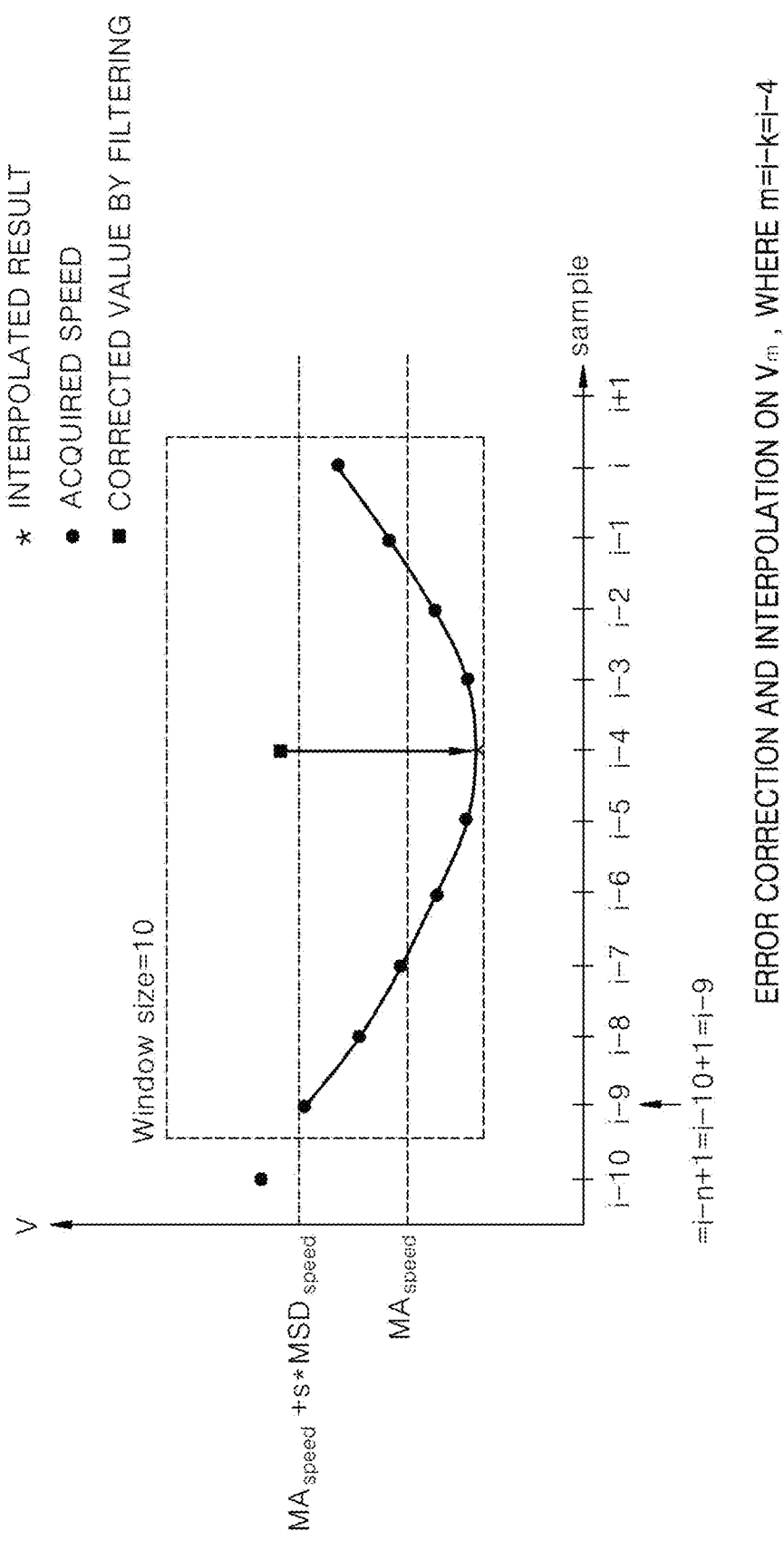
FIG. 2 explains a speed calibration method in which a speed value is interpolated by using a least square method according to another embodiment of the present invention.

FIG. 2 explains a speed correction method in which a speed value is interpolated by using a least square method according to another embodiment of the present invention.

FIG. 2 represents a result of using an interpolation method varied from an interpolation method by lines 18 to 21 of [Algorithm 2]. FIG. 2 uses a non-linear interpolation method using a plurality of data in a moving window. For example, it is possible to correct a moving data tuple having an index [i−4] by using a value corresponding to an asymptotic curve approximated by using a least square method and a plurality of data included in a moving window.

Figure 3:
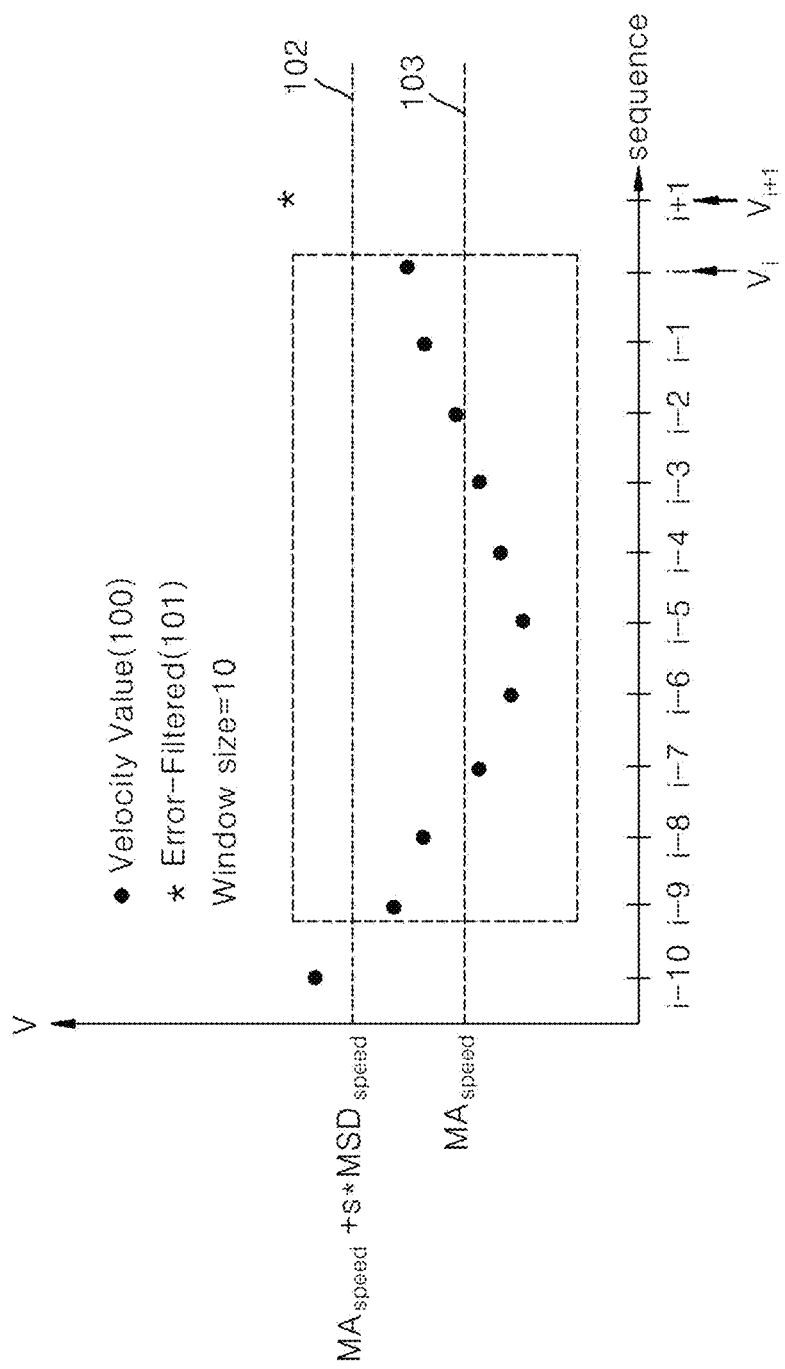
FIGS. 3 to 5 explain a method of filtering a position tuple, a method of estimating a speed using interpolation, and a method of calibrating a speed error according to embodiments of the present disclosure.
Figure 4:
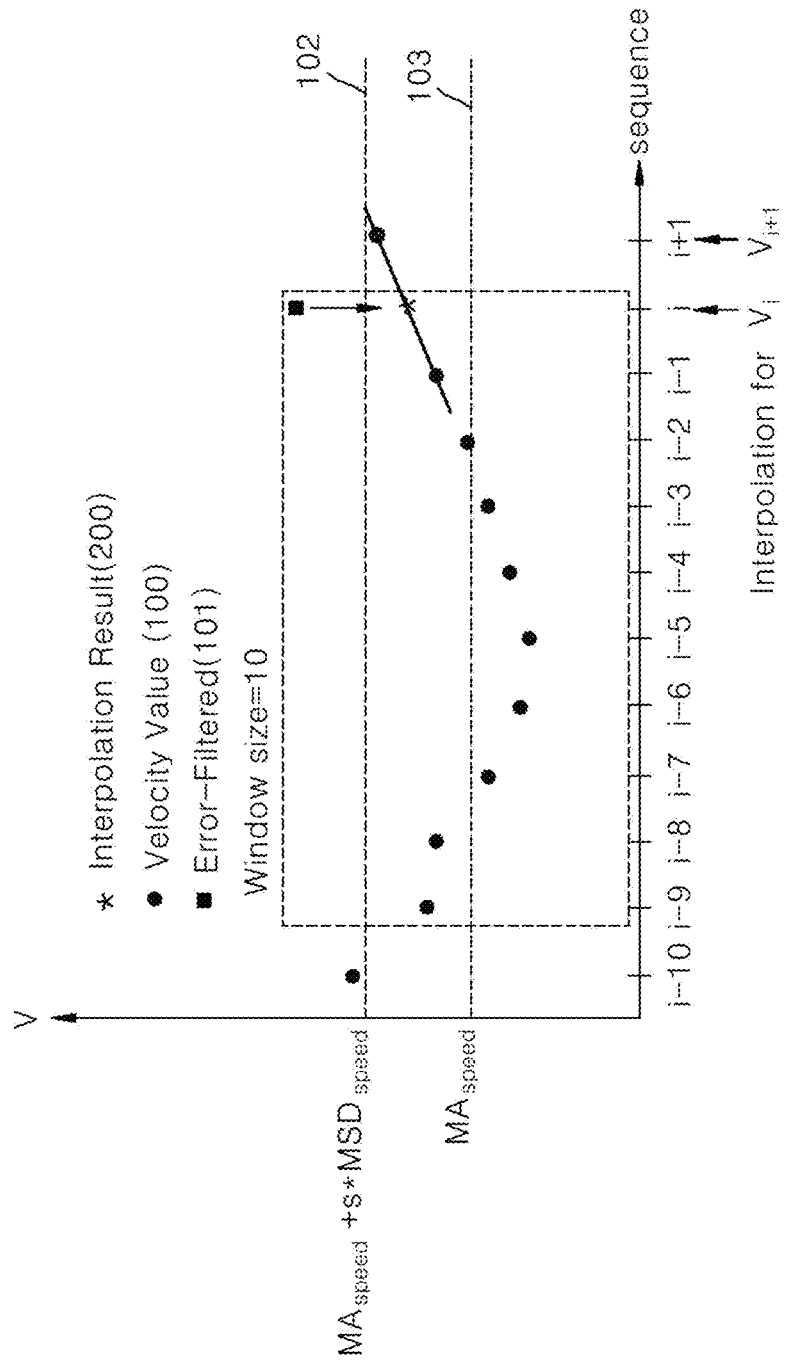
Figure 5:
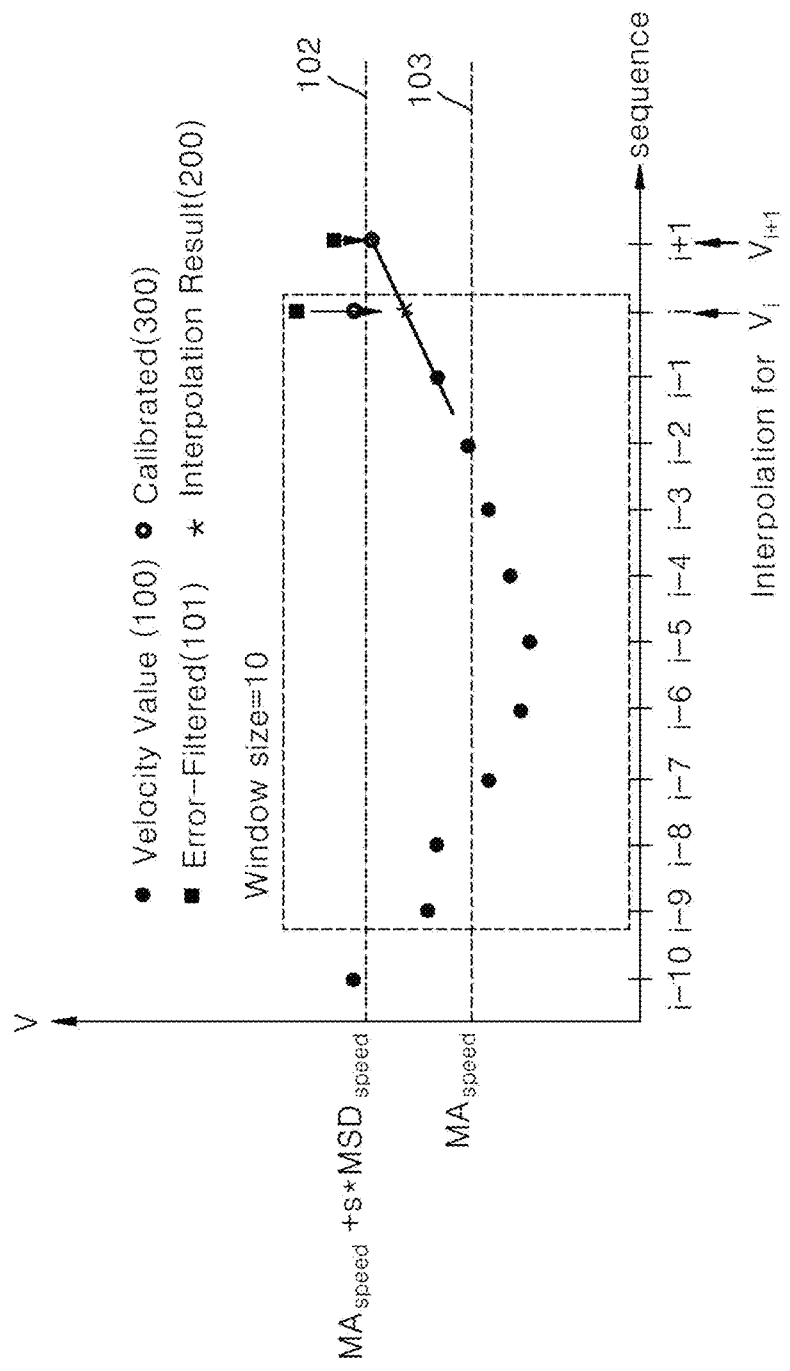

FIGS. 3 to 5 explain a method of filtering a position tuple, a method of estimating a speed using interpolation, and a method of calibrating a speed error according to other embodiments of the present disclosure.

The horizontal axes of FIGS. 3 to 5 represent the indexes of a timestamp and the vertical axes of FIGS. 3 to 5 represent a speed. Reference numeral 100 represents a speed actually measured at a corresponding timestamp and a reference numeral 101 represents a speed actually measured from a filtered-out tuple by using one of algorithms disclosed in the present disclosure. FIGS. 3 to 5 represent an example where a window size is 10. Reference numeral 103 represents the average value of speed in a window and reference numeral 102 represents the value 102 of the above-described moving significance interval. The position tuple of reference numeral 101 represented in FIG. 3 is filtered out because its speed is higher than the value 102 of the moving significance interval.

The reference numeral 101 (index i) of FIG. 4 represents a speed actually measured from a position tuple filtered-out according to the algorithm of the present disclosure. The reference numeral 200 of FIG. 4 represents an estimated value of a speed provided by linearly interpolating the speed value of an index i by the speed values of an index i−1 and an index i+1 that precede and follow it.

FIG. 5 represents a case where the tuples of the index i and the index i+1 are all filtered-out. In this case, since the actually measured speed of the index i (see reference numeral 101 of the index i) is higher than the value of a moving significance interval, it is already calibrated to a certain size (see reference numeral 300 of the index i). Next, since the actually measured speed of the index i+1 (see reference numeral 101 of the index i+1) is also higher than the value of a moving significance interval, it is calibrated to a certain size (see reference numeral 300 of the index i+1). Next, since the tuple of the index i is filtered out, the speed of the index i is interpolated by using the speeds of the index i+1 and the index i−1. In other words, in an embodiment of the present disclosure, the calibration of a speed may also be used as a pre-step for accurately estimating the speed.

It is possible to estimate the speed of a filtered-out one of actually measured tuples by using [Algorithm 2] but the position value of the filtered-out tuple is in a simply removed state. When using [Algorithm 3] represented in Tables 7 and 8 below, it is possible to estimate the position value of the filtered-out tuple. The speed estimation of [Algorithm 2] needs to consider only a positive (+) speed value, but since latitude and longitude have directionality, negative (−) differences at latitude and longitude may not be ignored for position estimation added to [Algorithm 3].

TABLE 7

Algorithm 3: Position Estimation Using Moving Window (1/2)

Require: $P_0$ // At least one initial tuple is required
Require: window size n
Require: user sensitivity level s
Require: error tolerance of distance $ET_D$
Ensure: Check validness of new position tuple TABLE 7-continued Algorithm 3: Position Estimation Using Moving Window (1/2)

Ensure: Calibrated series of tuple $\{P_i : t \geq i > 0\}$ for t inputs
Require: i=0 // $V_i$ is speed calculated from $P_{i-1}$ to $P_i$
1:   repeat
2:     Get $P_{i+1}$ // Acquisition of new tuple, if exist
3:     Set $V_{i+1} = dist(P_{i+1}, P_i)/(t_{i+1} - t_i)$
       // dist( ): distance between two geographic coordinate system points
4:     Set $MIN_{speed} = ET_D/(t_{i+1} - t_i)$
5:     Construct $MA_{speed}(n)$ with $\{P_x : max(i - n + 1, 0) \leq x \leq i\}$
6:     Construct $MSD_{speed}(n)$ with $\{P_x : max(i - n + 1, 0) \leq x \leq i\}$
7:     Set $MA_{speed} = MA_{speed}(n)$
8:     Set $MSD_{speed} = MSD_{speed}(n) > MIN_{speed})? MSD_{speed}(n) : MIN_{speed}$
       // Allow minimum room for moving significant interval
9:     Set $Vlat_{i+1} = |||lat_{i+1}, lat_i||/(t_{i+1} - t_i)$
10:    Construct $MA_{Vlatitude}(n)$ with $\{P_x : max(i - n + 1, 0) \leq x \leq i\}$
11:    Set $MA_{Vlatitude} = MA_{Vlatitude}(n)$
12:    Set $Vlon_{i+1} = |||lon_{i+1}, lon_i||/(t_{i+1} - t_i)$
13:    Construct $MA_{Vlongitude}(n)$ with $\{P_x : max(i - n + 1, 0) \leq x \leq i\}$
14:    Set $MA_{Vlongitude} = MA_{Vlongitude}(n)$
15:    if $((V_{i+1} > MA_{speed} + s * MSD_{speed})$ or $(a_{i+1} \geq MAX_{accelaration}))$
       and $(V_{i+1} > MIN_{speed})$ then
16:      Mark $P_{i+1}$ as filtered. // Filtering
17:    end if

TABLE 8

Algorithm 3 - continued (2/2)

18:    if $(V_{i+1} \geq MA_{speed} + s_{99.5} * MSD_{speed})$ and $(V_{i+1} > MIN_{speed})$ then
19:      Set $V_{i+1} = MA_{speed} + s_{99.5} * MSD_{speed}$ // Calibration of Speed
20:    end if
21:    if $a_{i+1} \geq MAX_{acceleration}$ then
22:      Mark $P_{i+1}$ as filtered
23:      Set $V_{i+1} = MA_{speed}$
24:      Set $a_{i+1} = MAX_{acceleration}$
25:      Set $lat_{i+1} = lat_i + sign(lat_{i+1} - lat_i) * MA_{Vlatitude} * (t_{i+1} - t_{i-1})$
26:      Set $lon_{i+1} = lon_i + sign(lon_{i+1} - lon_i) * MA_{Vlongitude} * (t_{i+1} - t_{i-1})$
       // Restriction by Maximum Acceleration
27:    end if
28:    if (Pi marked as filtered) then
29:      Set $V_i = ((V_{i+1} - V_{i-1}) * (t_i - t_{i-1}))/(t_{i+1} - t_{i-1}) + V_{i-1}$
30:      Mark $P_i$ as interpolated // Linear Interpolation or speed
31:      Set $lat_i = ((lat_{i+1} - lat_{i-1}) * (t_i - t_{i-1}))/(t_{i+1} - t_{i-1}) + lat_{i+1}$
32:      Set $lon_i = ((lon_{i+1} - lon_{i-1}) * (t_i - t_{i-1}))/(t_{i+1} - t_{i-1}) + lon_{i+1}$
       // Estimation of Position by interpolation
33:    end if
34:    Set $i = i + 1$
35:  until Exist no more input of positioning tuple A position calibrating method according to an embodiment of the present invention is described by using [Algorithm 3] above.

[Algorithm 3] introduces a parameter $ET_D$ for allowing a usual distance error (see line 4 of [Algorithm 3]). The parameter $ET_D$ may be set to e.g., 15 m for a GPS system in which SA is activated, from the circular error probable (CEP) concept a usual positioning system. It is also possible to change the value of the parameter $ET_D$ depending on the accuracy of the positioning system. The minimum speed and the minimum difference of latitude and longitude may be determined by the parameter $ET_D$, a moving standard deviation may be affected, and as a result, a moving significance interval may have a value other than zero. That is, by using the parameter $ET_D$, it is possible to introduce the CEP concept of the positioning system into [Algorithm 3] according to an embodiment of the present disclosure, and it is possible to avoid overfiltering tuples due to a small feasible speed error within the accuracy of the positioning system.

According to [Algorithm 3], it is possible to introduce a position estimation process into a filtered tuple, similar to the speed estimation process of [Algorithm 2]. The main difference of the position estimation process included in [Algorithm 3] is in the directionalities of latitude and longitude. That is, a speed value needs to consider only a positive value but in order to estimate a position, the negative difference of latitude and longitude may not be ignored. [Algorithm 3] represents the whole process for position estimation and corresponds to the whole process for the speed estimation of [Algorithm 2].

The parameters $V_{lat}$ and $V_{lon}$ refer to differences in latitude and longitude, respectively. [Algorithm 3] calculates the moving averages of the parameters $V_{lat}$ and $V_{lon}$. When one tuple is filtered by an excessive speed, it represents that a difference in position is excessive. Once there is such a situation, there is a need to estimate an accurate position. When acceleration error occurs, position data is corrected to the moving average MA of difference, similar to speed estimation (see lines 25 and 26 of [Algorithm 3]). Lastly, similar to speed estimation, interpolation is performed on latitude and longitude at the end of a moving window (see lines 31 and 32 of [Algorithm 3]). In addition, the directionality of a difference is also preserved (see lines 25, 26, 31 and 32 of [Algorithm 3]).

In line 4 of [Algorithm 3], when the time interval of a position tuple increases, there are cases where the value $MIN_{speed}$ by the parameter $ET_D$ becomes very small. In this case, in order to ensure the certain lower bound of the value $MIN_{speed}$, it is possible to change codes in line 4 of [Algorithm 3] to "Set $MIN_{speed} = (ET_D/(t_{i+1}-t_i) > MIN_{SPEED})? ET_D/(t_{i+1}-t_i) : MINSPEED$". In this example, MINSPEED is the minimum speed that is defined by a user of the present disclosure.

Figure 6:
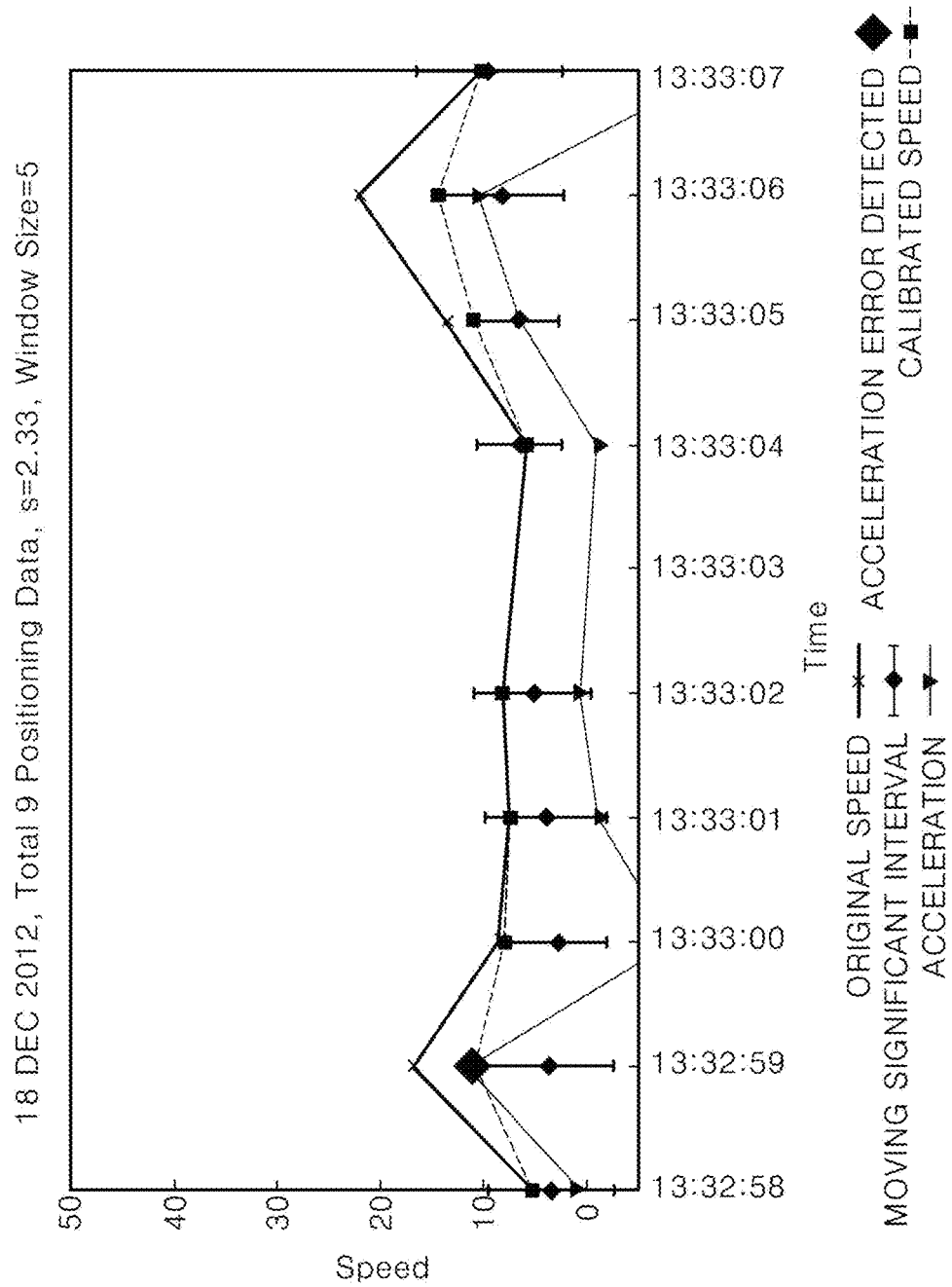
FIG. 6 explains a speed error detected without correcting a speed according to an embodiment of the present invention.
Figure 7:
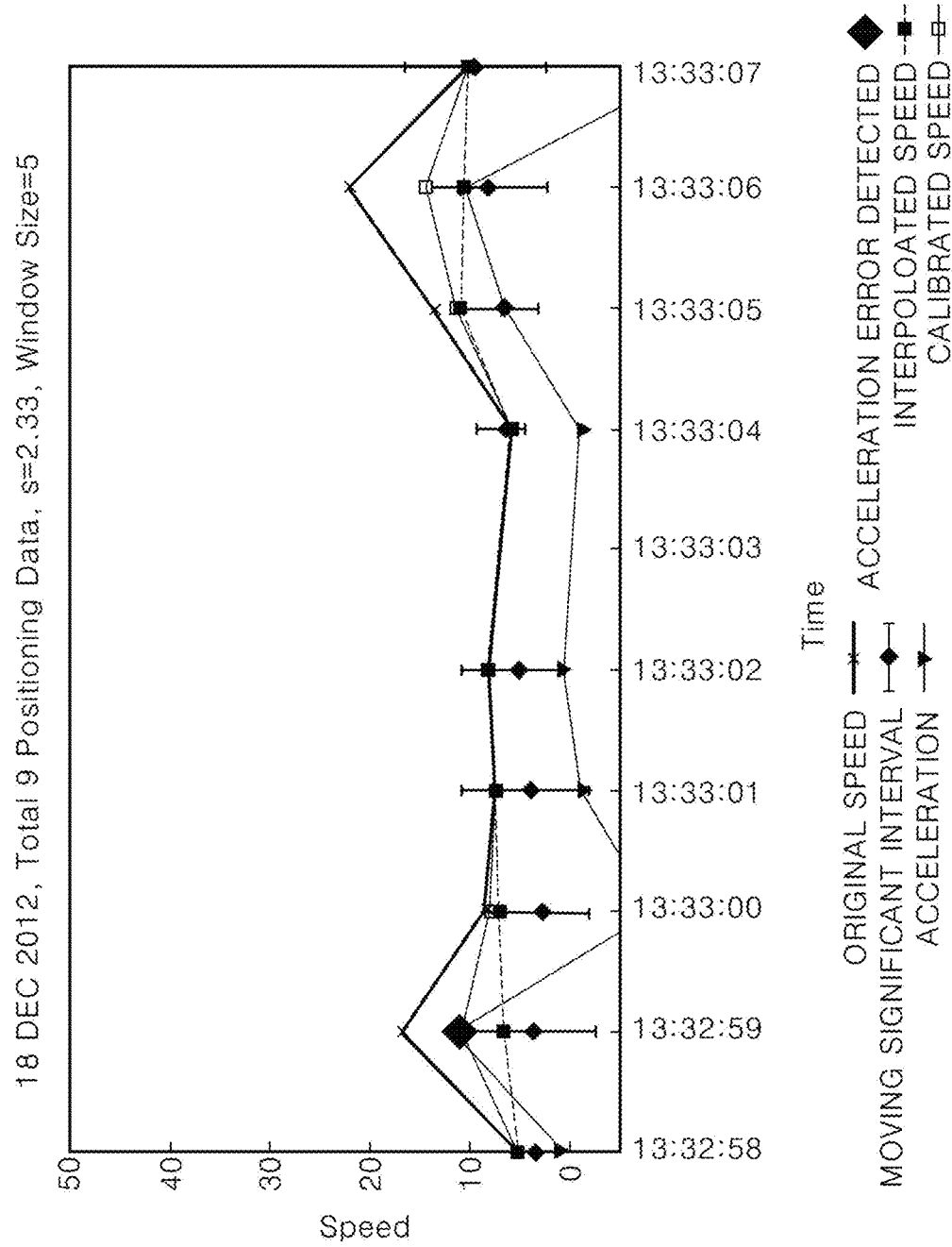
FIG. 7 explains a detected speed error by applying a speed calibration according to an interpolation mechanism according to an embodiment of the present invention.

FIG. 6 explains a speed error obtained from actually measured data, and FIG. 7 explains a speed error detected by applying a speed correction according to an interpolation mechanism according to an embodiment of the present disclosure. Each figure includes information on an origin speed, acceleration, a moving significant interval, a calibrated speed, an estimated speed, and a detected acceleration error. The acceleration error is shown in an inverted triangular shape. However, FIG. 6 does not include information on an interpolated speed. An empty rectangle represents a speed limited according to a calibration mechanism according to an embodiment of the present disclosure, and a dark rectangle represents an estimated speed by an interpolation mechanism. The speed on the y-axis has an m/s unit and the x-axis represents the time of the day. Even though an error that an origin speed is placed outside a moving significant interval near 13:33:06 is found, an algorithm according to an embodiment of the present invention properly estimates a feasible speed value. An apparent error by an acceleration limit occurs at the time of 13:32:59 on Dec. 18, 2012, but a speed error is limited to within an appropriate range by the calibration technique of the present disclosure and then, a speed is corrected by a speed estimation technique. Rather than a method of calibrating an error speed, a method of estimating a speed by an interpolation technique may further decrease an effect applied to a moving window. Thus, a moving significant interval following interpolation in FIG. 7 represents a difference, which is because the statistical value of a moving window varies by an interpolated speed value. The difference at the time of 13:33:04 is considerably great.

Tables 9 to 11 explain a fourth algorithm for position estimation according to another embodiment of the present disclosure.

<Table 9>

TABLE 9

Algorithm 4: Moving Window Based Position Estimation Method Using Backtracking (1/3)

Require: $P_0$ // At least one initial tuple is required
Require: IWS, MWS // IWS ≤ MWS
Require: window size n = IWS
Require: user sensitivity level s
Require: error tolerance of distance $ET_D$
 1:  i=0
 2:  NCE=0
 3:  repeat
 4:   Get $P_{i+1}$ // Acquisition of new tuple, if exist
 5:   Set $V_{i+1,original} = V_{i+1} = dist(P_{i+1}, P_i)/(t_{i+1} - t_i)$
       // dist( ): distance between two geographic coordinate system points
 6:   Set $MIN_{speed} = \left(\frac{ET_D}{t_{i+1} - t_i} > MINSPEED\right)? \frac{ET_D}{t_{i+1} - t_i} : MINSPEED$
 7:   Construct $MA_{speed}(n)$ with {$P_x$: max(i − n + 1, 0) ≤ x ≤ i}
 8:   Construct $MSD_{speed}(n)$ with {$P_x$: max(i − n + 1, 0) ≤ x ≤ i}
 9:   Set $MA_{speed} = MA_{speed}(n)$
10:   Set $MSD_{speed} = (MSD_{speed}(n) > MIN_{speed})? MSD_{speed}(n): MIN_{speed}$
       // Allow minimum room for moving significant interval
11:   Set $Vlat_{i+1} = ||lat_{i+1}, lat_i||/(t_{i+1} - t_i)$
12:   Construct $MA_{Vlatitude}(n)$ with {$P_x$: max(i − n + 1, 0) ≤ x ≤ i}
13:   Set $MA_{Vlatitude} = MA_{Vlatitude}(n)$
14:   Set $Vlon_{i+1} = ||lon_{i+1}, lon_i||/(t_{i+1} - t_i)$
15:   Construct $MA_{Vlongitude}(n)$ with {$P_x$: max(i − n + 1, 0) ≤ x ≤ i}
16:   Set $MA_{Vlongitude} = MA_{Vlongitude}(n)$
17:   Set $lat_{i+1,original} = lat_{i+1}$
18:   Set $lon_{i+1,original} = lon_{i+1}$

TABLE 10

Algorithm 4 - Continued (2/3)

19:  if ($P_{i-1}$ marked as filtered or interpolated)
      and ! ($P_{i-1}$ marked as accel_filtered)
      and ($V_{i-1,original}$ ≤ $MA_{speed}$ + s * $MSD_{speed}$) then
20:   $V_{i-1} = V_{i-1,original}$
21:   $lat_{i-1} = lat_{i-1,original}$
22:   $lon_{i-1} = lon_{i-1,original}$
      // Backtracking: Look back one step and Restore with original values
23:   Set NCE = 0
24:   n = (n−1 < IWS) ? IWS : n-- // Window Size Adjustment-Decrease
25:  end if TABLE 10-continued Algorithm 4 - Continued (2/3)

26:  if (($V_{i+1}$ > $MA_{speed}$ + s * $MSD_{speed}$) or ($a_{i+1}$ ≥ $MAX_{acceleration}$))
      and ($V_{i+1}$ > $MIN_{speed}$) then
27:   Mark $P_{i+1}$ as filtered. // Filtering
28:   NCE++
29:   n = (n+1 > MWS) ? MWS : n++ //Window Size Adjustment-Increase
30:  else
31:   Set NCE = 0
32:   n = (n−1 > IWS) ? IWS : n-- //Window Size Adjustment-Decrease
33:  end if
34:  if ($V_{i+1}$ ≥ $MA_{speed}$ + $s_{99.5}$ * $MSD_{speed}$) and ($V_{i+1}$ > $MIN_{speed}$) then
35:   Set $V_{i+1} = MA_{speed} + s_{99.5} * MSD_{speed}$ // Calibration of Speed
36:  end if

TABLE 11

Algorithm 4 - continued (3/3)

37:  if $a_{i+1}$ ≥ $MAX_{acceleration}$ then
38:   Mark $P_{i+1}$ as accel_filtered
39:   Set $V_{i+1} = MA_{speed}$
40:   Set $a_{i+1} = MAX_{acceleration}$
41:   Set $lat_{i+1} = lat_i + sign(lat_{i+1} - lat_i) * MA_{Vlatitude} * (t_{i+1} - t_{i-1})$
42:   Set $lon_{i+1} = lon_i + sign(lon_{i+1} - lon_i) * MA_{Vlongitude} × (t_{i+1} - t_{i-1})$
      // Restriction by Maximum Acceleration
43:  end if
44:  if ($P_i$ marked as filtered) then
45:   Set $V_i = ((V_{i+1} - V_{i-1}) * (t_i - t_{i-1})/(t_{i+1} - t_{i-1})) + V_{i-1}$
46:   Mark $P_i$ as interpolated // Linear interpolation of speed
47:   Set $lat_i = ((lat_{i+1} - lat_{i-1}) * (t_i - t_{i-1})/(t_{i+1} - t_{i-1})) + lat_{i-1}$
48:   Set $lon_i = ((lon_{i+1} - lon_{i-1}) * (t_i - t_{i-1})) / (t_{i+1} - t_{i-1}) + lon_{i-1}$
      // Estimation of Position by interpolation
49:  end if
50:  Set i = i + 1
51:  until Exist no more input of positioning tuple

[Algorithm 4] is the same as [Algorithm 3] excluding lines 2, 5, 6, 17 to 25, 28 to 32 and 38 of [Algorithm 4]. In the following, lines 2, 5, 6, 17 to 25, 28 to 32 and 38 of [Algorithm 4] are described.

Line 2 of [Algorithm 4]: In order to count the number of continuous errors, a parameter NCE is introduced and its value is initialized to zero.

Line 5 of [Algorithm 4]: V may be changed to another value by another part of [Algorithm 4]. For example, V may be replaced with another calibrated value or estimated value in lines 35, 39 and 45 of [Algorithm 4]. However, in line 20 of [Algorithm 4], the estimated value provided through a replacement may be replaced back with an original value (calculated from an actually measured value and then stored), and in order to perform such an operation, the original value of V is separately stored in line 5.

Line 6 of [Algorithm 4]: $MIN_{speed}$ for the minimum speed is set to a smaller one of $ET_D/(t_{i+1} - t_i)$ and a predetermined minimum value MINSPEED. That is, the minimum value of a moving standard deviation is determined.

Lines 17 and 18 of [Algorithm 4]: lat and lon may be changed to other values by other parts of [Algorithm 4]. For example, lat and lon may be replaced with other calibrated values or estimated values in lines 41, 42, 47 and 48 of [Algorithm 4]. However, in lines 21 and 22 of [Algorithm 4], values provided through a replacement may be replaced back with original values, and in order to perform such an operation, the original values of lat and lon are separately stored in lines 17 and 18.

Line 19 of [Algorithm 4]: Line 19 of [Algorithm 4] represents a condition for performing backtracking represented in lines 20 to 22 of [Algorithm 4]. In this case, three conditions are discussed which should be satisfied. Firstly, a tuple $P_{i-1}$ at a backtracking discussion target timestamp (i−1) should be filtered or interpolated, secondly, the tuple $P_{i-1}$ at a backtracking discussion target timestamp (i−1) should not be accel_filtered by an acceleration error, and thirdly, the original speed $V_{i-1, original}$ of the tuple of the backtracking discussion target timestamp (i−1) should belong to a moving significant interval "$MA_{speed}+s \times MSD_{speed}$" determined by a window defined as timestamps [i−n+1, . . . , i].

Lines 20 to 24 of [Algorithm 4]: When the condition of line 19 of [Algorithm 4] is satisfied, V, lon, and lat values are replaced back with their original values in lines 20 to 22 of [Algorithm 4]. That is, it is determined that the original V, lan and lat values are more accurate than V, lon and lat values calibrated or estimated by other parts of [Algorithm 4], and a return to actually measured data is performed (backtracking). When the backtracking occurs, the NCE is initialized to zero in line 23 and a window size n decreases in line 24. However, the window size n may not be smaller than the minimum value IWS.

Lines 28 and 29 of [Algorithm 4]: When a tuple $P_{i+1}$ is filtered, NCE increases in line 28. That is, the number of continuous errors increases. In addition, the window size n increases in line 29. However, the window size n may not be larger than the maximum value MWS.

Lines 31 and 32 of [Algorithm 4]: When the tuple $P_{i-1}$ is not filtered, NCE is initialized to zero in line 31. In addition, the window size n decreases in line 32. However, the window size n may not be smaller than the minimum value IWS.

Line 38 of [Algorithm 4]: When newly measured acceleration is higher than the maximum acceleration, a newly actually measured tuple is filtered and a mark is made as accel_filtered by an acceleration error.

Figure 8:
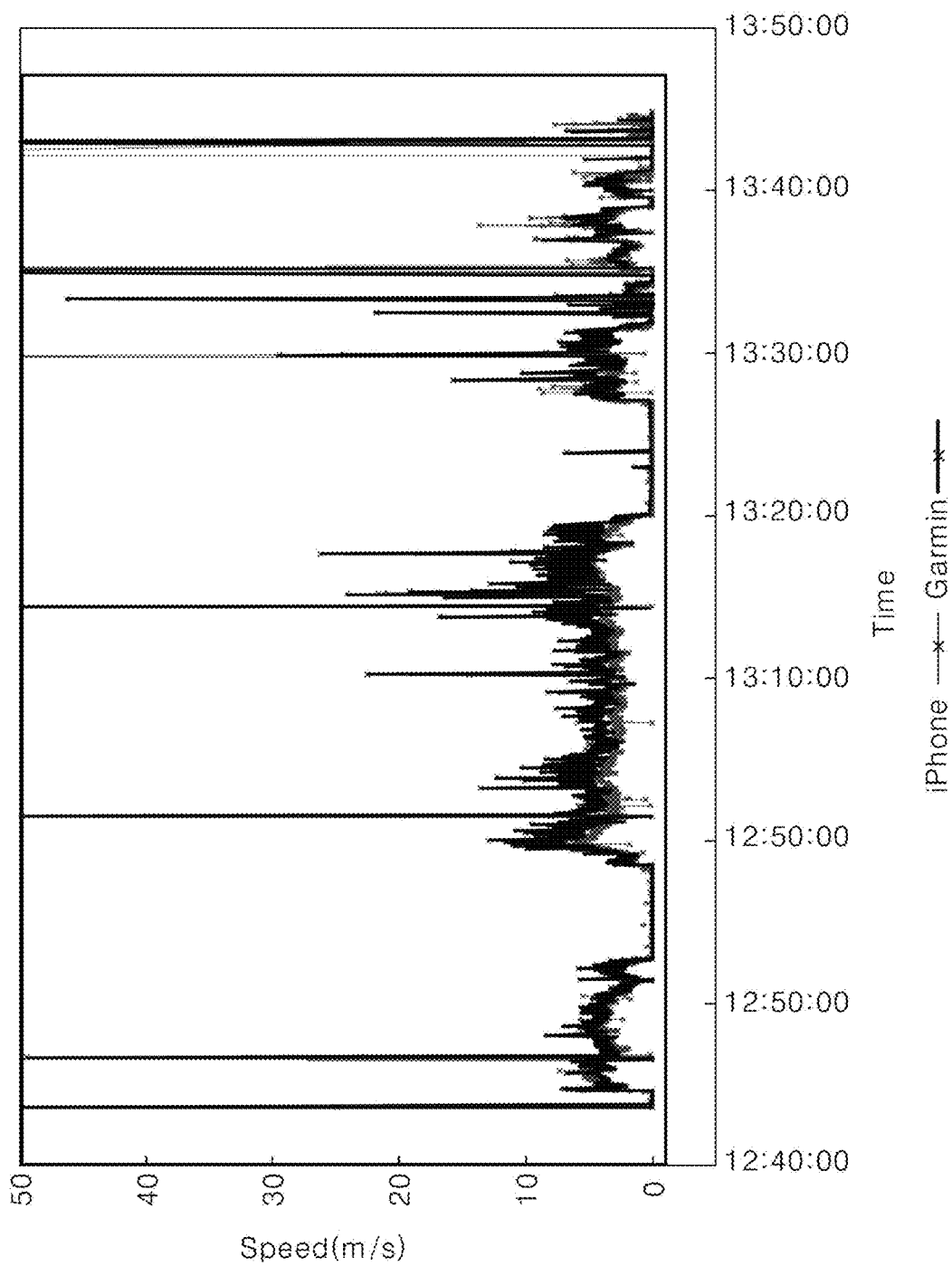
FIG. 8 represents a speed actually measured by using an available position detector.

FIG. 8 represents a speed actually measured by using position detectors iPhone and Garmin. In this experiment, a speed varies with a continuous value over time but it may be seen that the actually measured data of iPhone and Garmin sometimes has a sudden increase or decrease in speed, which corresponds to an error.

Figure 9:
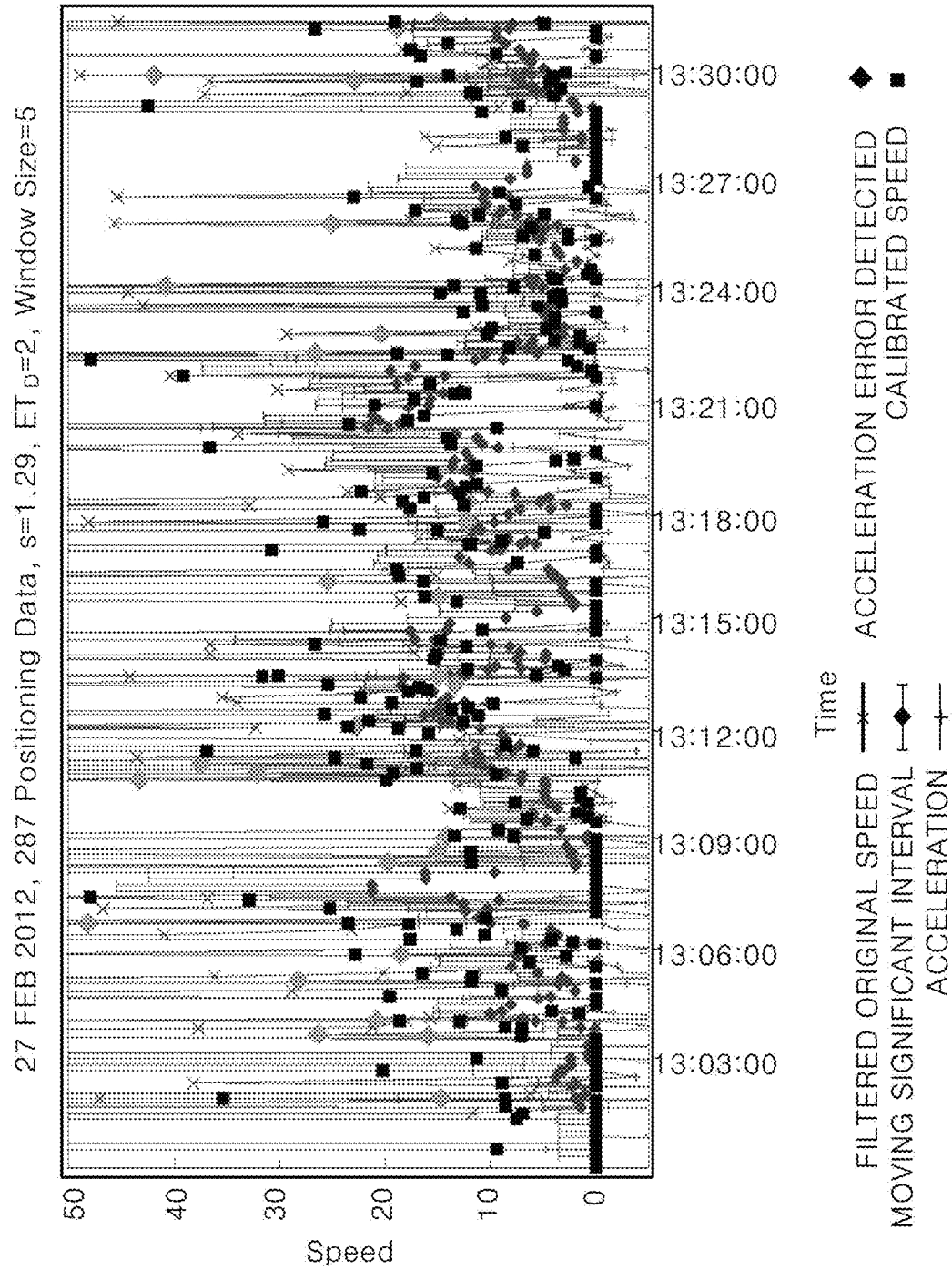
FIGS. 9 and 10 are graphs derived by applying the concepts of a moving significant interval, acceleration error detection and a calibrated speed according to the present disclosure.
Figure 10:
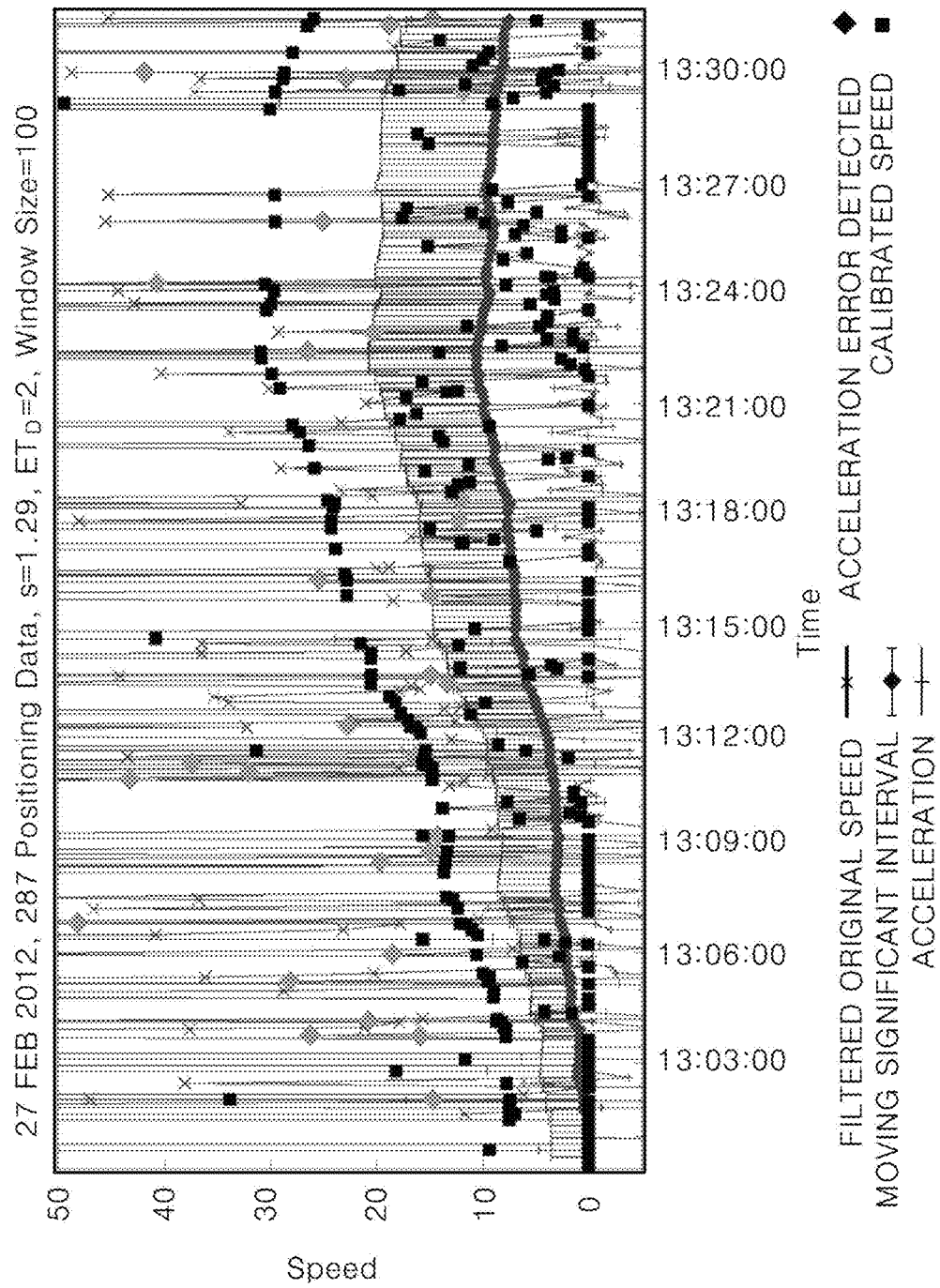

FIGS. 9 and 10 are graphs derived by applying the concepts of a moving significant interval, acceleration error detection and a calibrated speed that are described in embodiments of the present disclosure. In FIG. 9, a window size is set to 5, and in FIG. 10, the windows size is set to 100. FIGS. 9 and 10 use 287 raw position data acquired on Feb. 27, 2012.

When the window size is small (n=5) as shown in FIG. 9, a moving significant interval and a calibrated speed sensitively reflect a change in speed. However, when the window size is large (n=100) as shown in FIG. 10, it may be seen that the moving significant interval and the calibrated speed do not sensitively reflect a change in speed.

Figure 11:
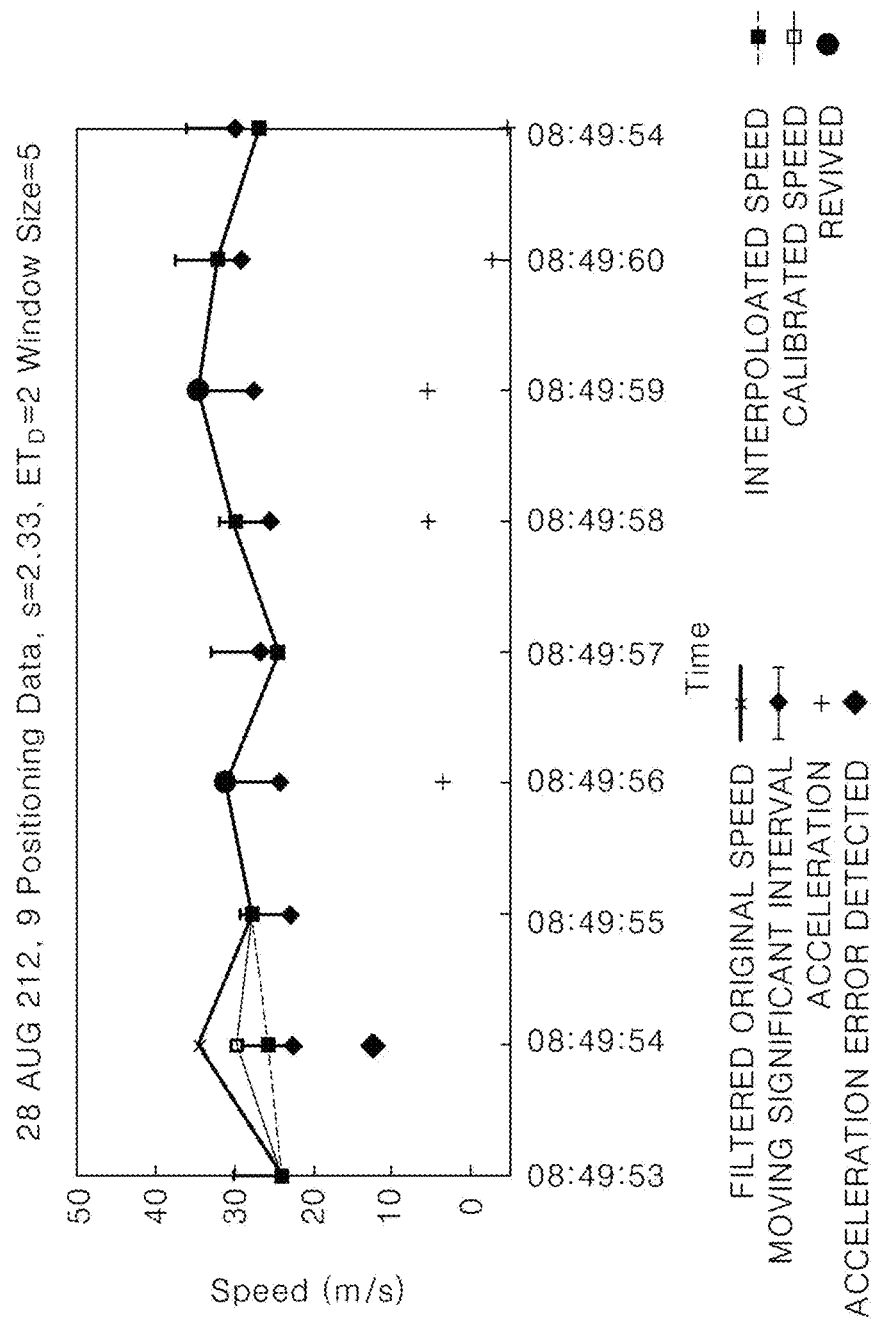
FIG. 11 represents an example of data processed according to Algorithm 4 according to an embodiment of the present disclosure.

FIG. 11 represents an example of data processed according to [Algorithm 4]. The graph is crated by using 9 position data actually measured on Aug. 8, 2012 and includes information on a filtered original speed, a moving significant interval, acceleration, a detected acceleration error, an interpolated speed, a calibrated speed, a speed revived by backtracking. At the time of 08:49:54, since the filtered original speed is out of a range of the moving significant interval and an acceleration error is already detected, the interpolated speed is maintained as is. On the other hand, at the times of 08:49:56 and 08:49:59, the original speed is within the range of the moving significant interval and the acceleration error is not detected, it may be seen that the interpolated speed is replaced by [Algorithm 4] and revived.

In the following, a position calibration method according to another embodiment of the present disclosure is described with reference to [Algorithm 4].

It is possible to perform the following steps in order to process information on a tuple including latitude, longitude and a timestamp collected from a position information collection device.

In step S11, it is possible to determine whether a speed [i+1] $V_{i+1}$ at a timestamp [i+1] has an error (see line 34).

In step S12, when it is determined that the speed [i+1] has an error ($V_{i+1} \geq MA_{speed}+s_{99.5} \times MSD_{speed}$) in step S11, the speed [i+1] is pre-calibrated or restricted (see line 35). In this case, when the speed [i+1] is lower than or equal to a predetermined minimum speed $MIN_{speed}$, it is determined that the speed [i+1] has no error (see line 35). In this case, the minimum speed may be determined by an error tolerance of distance $ET_D$ or a predetermined minimum value MINSPEED (see line 6).

In step S13, it is determined that acceleration [i+1] $a_{i+1}$ at a timestamp [i+1] has an error (see line 37). In this case, when the acceleration [i+1] is equal to or higher than predetermined maximum acceleration $MAX_{acceleration}$, it may be determined that the acceleration [i+1] has an error (see line 37).

In step S14, when it is determined that the acceleration [i+1] $a_{i+1}$ has an error in step S13, latitude [i+1] and longitude [i+1] are calibrated (see lines 41 and 42). In this case, it is possible to calibrate the longitude [i+1] by using an average longitude difference $MA_{Vlongitude}$ until a timestamp [i] and the longitude [i] $lon_i$ at the timestamp [i], and it is possible to calibrate the latitude [i+1] by using an average latitude difference $MA_{Vlatitude}$ until the timestamp [i] and the latitude [i] $lat_i$ at the timestamp [i] (see lines 41 and 42). In this case, the average longitude difference $MA_{Vlongitude}$ set in line 16 of Algorithm 4 means a value obtained by averaging, over time, a longitude difference at each timestamp set in line 14, and the average latitude difference $MA_{Vlatitude}$ set in line 13 means a value obtained by averaging, over time, a latitude difference at each timestamp set in line 11.

In step S21, it is checked whether a tuple [i] $P_i$ at the timestamp [i] $t_i$ has an error (see line 44). In this case, the presence of the error means that the tuple [i] $P_i$ is filtered by a speed error as described above.

In step S22, when it is confirmed that there is an error, the latitude [i] $lat_i$ at the timestamp [i] is estimated by interpolating the latitude [i+1] $lat_{i+1}$ at the timestamp [i+1] $t_{i+1}$ and one or more latitudes acquired before the timestamp [i], and the longitude [i] $lon_i$ at the timestamp [i] is estimated by interpolating the longitude [i+1] $lon_{i+1}$ at the timestamp [i+1] $t_{i+1}$ and one or more longitudes acquired before the timestamp [i] (see lines 47 and 48). In this case, "acquired" may mean being processed by [Algorithm 4] and stored in a memory.

In this case, when it is confirmed that there is an error in step S21, a position calibration method according to the embodiment may further include step S23.

In step S23, it is possible to estimate a speed [i] $V_i$ at the timestamp [i] by interpolating a speed [i+1] $V_{i+1}$ at the timestamp [i+1] and one or more speeds acquired before the timestamp [i] (see line 45).

In step S31, when the error at the timestamp [i−1] occurs by a speed error and not by an acceleration error, it is possible to determine whether a speed value actually measured at the timestamp [i−1] is smaller than a statistical value, by calculating the statistical value using the average $MA_{speed}$ and standard deviation $MSD_{speed}$ of speeds stored at the timestamps [i−n+1] to [i] (see line 19). In this example, the "speed stored" means a value that is processed by [Algorithm 4] and stored in a memory.

In step S32, when it is determined that the actually measured speed value is smaller than the statistical value in step S31, a speed, latitude, and longitude at the timestamp [i] may be replaced with actually measured original values (see lines 20 to 22). In this case, n above is the size of a window.

In step S33, it is determined that the actually measured speed value is smaller than the statistical value in step S31, it is possible to decrease n (see line 24).

In step S34, when it is confirmed that there is an error at the timestamp [i], it is possible to increase the size of the window (see line 29), and when it is confirmed that there is no error at the timestamp [i], it is possible to decrease the size of the window (see line 32). In this example, the presence of the error may include both when there is a speed error and when there is an acceleration error.

A user device according to another embodiment of the present disclosure may include a position information collection unit that collects information on a tuple including latitude, longitude and a timestamp; and a processing unit that processes information on the tuple.

In this case, the processing unit may perform lines 19, 20 to 22, 24, 29, 32, 34, 35, 37, 41, 42, 44, 45, 47, and 48 of [Algorithm 4].

Each step as described above may be performed every timestamp. Algorithm 4 is described based on the timestamp [i+1] at which a new tuple is acquired, and it is possible to describe Algorithm 4 based the timestamp [i+2]. In this case, in the description of e.g., step S31 above, in the index of the timestamp increases by +1.

Tables 12 and 13 explain Algorithm 5 for position estimation according to another embodiment of the present disclosure.

TABLE 12

Algorithm 5: Position Estimation Method Converting Significant Level Value in Real Time (1/2)

Require: $P_0$
Require: window size n
Require: initial sensitivity level s = 1.00
Require: error rate Erate
Require: error count Ecount = 0
Require: minimum sample size ms = 40
Require: next minimum sample size nms = 41

Require: $f(x) = \int_{-\infty}^{x} \frac{1}{\sqrt{2\pi}} e^{\frac{-x^2}{2}} dx$ Require: error tolerance of distance $ET_D$
Require: minimum speed allowance MINSPEED
Require: i=0
1:   repeat Get $P_{i+1}$
2:     if(s is Changed)
3:       ms = $1/(1 − f(s))^2$
4:       nms = $1/(1 − f(s + 0.01))^2$
5:     end if
6:   Set $MIN_{speed} = \left(\frac{ET_D}{t_{i+1} − t_i} > MINSPEED\right)? \frac{ET_D}{t_{i+1} − t_i} : MINSPEED$ 7:   Construct $MA_{speed}(n)$ with $\{P_x : \max(i − n + 1, 0) \leq x \leq i\}$
8:   Construct $MSD_{speed}(n)$ with $\{P_x : \max(i − n + 1, 0) \leq x \leq i\}$
9:   Set $MA_{speed} = MA_{speed}(n)$

TABLE 13

Algorithm 5 - Continued (2/2)

10:    Set $MSD_{speed} = MSD_{speed}(n)$
11:    if $((V_{i+1} > MA_{speed} + s * MSD_{speed})$ or $(a_{i+1} \geq MAX_{acceleration}))$ and $(V_{i+1} > MIN_{speed})$ then
12:       Mark $P_{i+1}$ as filtered
13:    end if
14:    if $(V_{i+1} \geq MA_{speed} + s_{99.5} * MSD_{speed})$ and $(V_{i+1} > MIN_{speed})$ then
15:       Set $V_{i+1} = MA_{speed} + s_{99.5} * MSD_{speed}$
16:    end if
17:    if $(a_{i+1} \geq MAX_{acceleration})$ then
18:       Mark $P_{i+1}$ as accel_filtered
19:       Set $V_{i+1} = MA_{speed}$
20:       Set $a_{i+1} = MAX_{acceleration}$
21:    end if
22:    if ($P_i$ marked as filtered) then
23:       Set $V_i = (V_{i+1} − V_{i−1}) * (t_i − t_{i−1})/(t_{i−1} − t_{i−1}) + V_{i−1}$
24:       Set Ecount++
25:       Mark $P_i$ as interpolated
26:    end if
27:    Set Erate = Ecount/(i+1)
28:    if $((i+1) >= ms)$
29:       if(Erate < $(1−f(s))$ and $(i+1) >=$ nms)
30:          Set s+=0.01
31:          Mark s as changed
32:       else if(Erate > $(1−f(s))$)
33:          Set s−=0.01
34:          Mark s as changed
35:    Set i = i + 1
36:   until Exist no more input of positioning tuple

[Algorithm 5] is the same as [Algorithm 4] excluding lines 2 to 5, 24, 28, and 29 to 34 of [Algorithm 5]. In the following, lines 2 to 4, 24, and 28 to 34 of [Algorithm 5] are described.

Line 2 of [Algorithm 5]: Line 2 of [Algorithm 5] represents a condition for changing a minimum sample size and a next minimum sample size represented in lines 3 and 4 of [Algorithm 5]. That is, only when a condition that a significant level s is changed is satisfied, one or more of a minimum size ms and a next minimum size nms are changed based on a changed significant level s. In this case, when the significant level s is changed, descriptions are provided below with reference to lines 28 to 34 of [Algorithm 5].

Lines 3 to 4 of [Algorithm 5]: When line 2 of [Algorithm 5] is satisfied, the ms is changed to $1/(1−f(s))^2$ and the nms is changed to $1/(1−f(s+0.01))^2$, in lines 3 to 4 of [Algorithm 5]. In this case, the function f(s) may be given by Equation 2.

$$f(x) = \int_{-\infty}^{x} \frac{1}{\sqrt{2\pi}} e^{\frac{-x^2}{2}} dx \quad \langle \text{Equation 2} \rangle$$

Line 24 of [Algorithm 5]: when line 22 of [Algorithm 5] is satisfied, Ecount increases in line 24 of [Algorithm 5]. That is, it is checked whether a tuple [i] $P_i$ at a timestamp [i] $t_i$ has an error (i.e., the tuple is filtered) and when the tuple [i] has an error, Ecount increases. In this case, Ecount represents the number of tuples that have errors. In this case, line 22 of [Algorithm 5] corresponds to line 44 of [Algorithm 4] as described above.

Line 27 of [Algorithm 5]: Erate for an error rate is determined depending on Ecount and the number of tuples collected until the timestamp [i+1]. That is, Erate is set to Ecount/(i+1).

Line 28 of [Algorithm 5]: Line 28 of [Algorithm 5] represents a condition for converting the significant level s represented in lines 29 to 34 of [Algorithm 5]. That is, only when the number of data (tuples) collected until the timestamp [i+] exceeds the ms, the significant level s is converted in consideration of Erate. In this case, conditions for converting the significant level s in consideration of Erate may be divided into two sections. Regarding this matter, descriptions are provided below with reference to lines 29 to 34 of [Algorithm 5].

Lines 29 to 31 of [Algorithm 5]: Line 29 of [Algorithm 5] is a first condition for converting the significant level s, when line 28 of [Algorithm 5] is satisfied. That is, when the error rate Erate of data collected until the timestamp [i+1] is lower than the error possibility of the significant level s and the number of data collected until the timestamp [i+1] exceeds nms, the significant level s increases by 0.01. In this case, since ms increases as the significant level s increases, nms should be together considered as described above. In this case, the value+0.01 may also be replaced with another value.

Lines 32 to 34 of [Algorithm 5]: Line 32 of [Algorithm 5] is a second condition for converting the significant level s, when line 28 of [Algorithm 5] is satisfied. That is, when the error rate of data collected until the timestamp [i+1] is higher than the error possibility of the significant level s, the significant level s decreases by 0.01. In this case, the value −0.01 may also be replaced with another value.

In the following, the result of an experiment practiced by applying [Algorithm 5] according to another embodiment of the present disclosure is described with reference to Table 14.

In the following, the statistics of the error rate depending on whether the significant level varies according to another embodiment of the present disclosure are compared and described with reference to Table 14.

Table 14 compares statistics when the significant level varies and when the significant level is fixed.

TABLE 14

|  | When Significant Level Varies | When Significant Level Is Fixed |
|---|---|---|
| Number of data | 11,118 | 11,118 |
| Number of Detected Errors | 313 | 283 |
| Error Rate (%) | 2.81525 | 2.54542 |
| Initial Significant Level | 1.65 | 2.33 |
| Last Significant Level | 1.91 | 2.33 |

Referring to Table 14, it may be seen that the number of errors detected from all data is larger when the significant level varies rather than when the significant level is fixed.

In the following, a position calibration method according to another embodiment of the present disclosure is described with reference to [Algorithm 5].

In order to change the significant level s for detecting the error of a tuple [i+1] $P_{i+1}$ at a timestamp [i+1], the following steps may be performed.

In step S41, it is confirmed whether a speed [i+1] $V_{i+1}$ at the timestamp [i+1] has an error, and when the speed [i+1] has an error, the speed [i+1] is pre-calibrated or restricted (see lines 14 to 16). This also corresponds to steps S11 and S12 of Algorithm 4 as described above.

In step S42, it is confirmed whether acceleration [i+1] $a_{i+1}$ at the timestamp [i+1] has an error, and when the acceleration [i+1] has an error, the acceleration [i+1] and the speed [i+1] are pre-calibrated (see lines 17 to 21). This also corresponds to step S13 of Algorithm 4 as described above.

In step S43, it is checked whether a tuple [i] $P_i$ at the timestamp [i] $t_i$ has an error, and when the tuple [i] has an error, it is possible to estimate the speed [i] $V_i$ at the timestamp [i] by linearly interpolating a speed [i+1] $V_{i+1}$ at the timestamp [i+1] and one or more speeds acquired before the timestamp [i] (see lines 22 and 23). This also corresponds to steps S21 and S23 of Algorithm 4 as described above. In this case, when the tuple [i] has an error in step S43, a position calibration method according to another embodiment of the present disclosure may further include step S44.

In step S44, Ecount representing the number of tuples having an error increases (see line 24).

In step S51, when the error rate of data collected until the timestamp [i+1] is lower than the error possibility of a significant level s, the significant level s increases by 0.01 (see lines 29 to 31).

In step S52, when the error rate of data collected until the timestamp [i+1] is higher than the error possibility of the significant level s, the significant level s decreases by 0.01 (see lines 32 to 34).

In this case, in steps S51 and S52, only when the number of tuples collected until the timestamp [i+1] exceeds a minimum sample size ms, it is possible to change the significant level s (see line 28).

In step S61, when the significant level s changes according to steps S51 and S52, one or more of the minimum sample size and a next minimum sample size are changed based on a changed significant level s (see lines 2 to 4).

In the following, [Algorithm 6] for position estimation according to another embodiment of the present disclosure is described with reference to Tables 15 to 18.

TABLE 15

Algorithm 6: Moving Window Based Position Estimation Method Using Backtracking (1/4)

Require: $P_0$ // At least one initial tuple is required
Require: IWS, MWS // IWS ≤ MWS
Require: window size n = IWS
Require: initial sensitivity level s = 1.00
Require: error rate Erate
Require: error count Ecount = 0
Require: minimum sample size ms = 40
Require: next minimum sample size nms = 41

Require: $f(x) = \int_{-\infty}^{x} \frac{1}{\sqrt{2\pi}} e^{\frac{-x^2}{2}} dx$ Require: error tolerance of distance $ET_D$
Require: minimum speed allowance MINSPEED
1:   i=0
2:   NCE=0
3:   repeat
4:      Get $P_{i+1}$ // Acquisition of new tuple, if exist
      if(s is Changed)
       ms = $1/(1-f(s))^2$
       nms = $1/(1-f(s+0.01))^2$
      end if

TABLE 16

Algorithm 6 - Continued (2/4)

5:   Set $V_{i+1, original} = V_{i+1} = \text{dist}(P_{i+1}, P_i)/(t_{i+1} - t_i)$
     // dist( ): distance between two geographic coordinate system points 6:   Set $\text{MIN}_{speed} = \left(\frac{ET_D}{t_{i+1} - t_i} > \text{MINSPEED}\right)? \frac{ET_D}{t_{i+1} - t_i} : \text{MINSPEED}$ TABLE 16-continued Algorithm 6 - Continued (2/4)

```
7:   Construct MA_speed(n) with {P_x: max(i − n +1, 0) ≤ x ≤ i}
8:   Construct MSD_speed(n) with {P_x: max(i − n +1, 0) ≤ x ≤ i}
9:   Set MA_speed = MA_speed(n)
10:  Set MSD_speed = (MSD_speed(n) > MIN_speed)? MSD_speed(n): MIN_speed
     // Allow minimum room for moving significant interval
     or Set MSD_speed = MSD_speed(n)
11:  Set Vlat_{i+1} = |||lat_{i+1}, lat_i||/(t_{i+1} − t_i)
12:  Construct MA_Vlatitude(n) with {P_x: max(i − n + 1, 0) ≤ x ≤ i}
13:  Set MA_Vlatitude = MA_Vlatitude(n)
14:  Set Vlon_{i+1} = |||lon_{i+1}, lon_i||/(t_{i+1} − t_i)
15:  Construct MA_Vlongitude(n) with {P_x: max(i − n + 1, 0) ≤ x ≤ i}
```

TABLE 17-continued

Algorithm 6 - Continued (3/4)

```
32:     n = (n − 1 > IWS) ? IWS : n−− // Window Size Adjustment-Decrease
33:   end if
34:   if (V_{i+1} ≥ MA_speed + s_{99.5} * MSD_speed) and (V_{i+1} > MIN_speed) then
35:      Set V_{i+1} = MA_speed + s_{99.5} * MSD_speed // Calibration of Speed
36:   end if
37:   if a_{i+1} ≥ MAX_acceleration then
38:      Mark P_{i+1} as accel_filtered (or Mark P_{i+1} as filtered)
39:      Set V_{i+1} = MA_speed
40:      Set a_{i+1} = MAX_acceleration
41:      Set lat_{i+1} = lat_i + sign(lat_{i+1} − lat_i) * MA_Vlatitude * (t_{i+1} − t_{i−1})
42:      Set lon_{i+1} = lon_i + sign(lon_{i+1} − lon_i) * MA_Vlongitude * (t_{i+1} − t_{i−1})
      // Restriction by Maximum Acceleration
43:   end if
```

TABLE 18

Algorithm 6 - Continued (4/4)

```
44:   if (P_i marked as filtered) then
45:      Set V_i = ((V_{i+1} − V_{i−1}) * (t_i − t_{i−1}))/(t_{i+1} − t_{i−1}) + V_{i−1}
         Set Ecount++
46:      Mark P_i as interpolated // Linear interpolation of speed
47:      Set lat_i = ((lat_{i+1} − lat_{i−1}) * (t_i − t_{i−1}))/(t_{i+1} − t_{i−1}) + lat_{i−1}
48:      Set lon_i = ((lon_{i+1} − lon_{i−1}) * (t_i − t_{i−1}))/(t_{i+1} − t_{i−1}) + lon_{i−1}
         // Estimation of Position by interpolation
49:   end if
      Set Erate = Ecount/(i+1)
      if ((i+1) >= ms)
         if(Erate < (1−f(s)) and (i+1) >= nms)
            Set s+=0.01
            Mark s as changed
         else if(Erate > (1−f(s)))
            Set s−=0.01
            Mark s as changed
         end if
      end if
50:   Set i = i + 1
51: until Exist no more input of positioning tuple
```

TABLE 16-continued

Algorithm 6 - Continued (2/4)

```
16:   Set MA_Vlongitude = MA_Vlongitude(n)
17:   Set lat_{i+1,original} = lat_{i+1}
18:   Set lon_{i+1,original} = lon_{i+1}
19:   if (P_{i−1} marked as filtered or interpolated)
      and ! (P_{i−1} marked as accel_filtered)
      and (V_{i−1,original} ≤ MA_speed + s * MSD_speed) then
20:      V_{i−1} = V_{i−1,original}
21:      lat_{i−1} = lat_{i−1,original}
22:      lon_{i−1} = lon_{i−1,original}
         // Backtracking: Look back one step and Restore with
         original values
23:      Set NCE = 0
24:      n = (n−1 < IWS) ? IWS: n−− // Window Size Adjustment-Decrease
25:   end if
26:   if ((V_{i+1} > MA_speed + s * MSD_speed) or (a_{i+1} ≥ MAX_acceleration))
         and (V_{i+1} > MIN_speed) then
```

TABLE 17

Algorithm 6 - Continued (3/4)

```
27:      Mark P_{i+1} as filtered. // Filtering
28:      NCE++
29:      n = (n+1 > MWS) ? MWS : n++ // Window Size
         Adjustment-Increase
30:   else
31:      Set NCE = 0
```

Algorithm 6 is obtained by combining Algorithm 5 with Algorithm 4.

Each of the above-described steps may be performed by a user device that includes a position information collection unit collecting information on a tuple including latitude, longitude and a timestamp; and a processing unit processing information on the tuple.

It is possible to achieve two goals through an algorithm according to another embodiment of the present disclosure as described above. Firstly, through the introduction of the $ET_D$ and the real-time throttling of a moving significant interval, more flexible calibration about an environmental change is performed. Secondly, an error rate is changed in real time through a change in significant level. This result may remove errors from many systems using position information in the future and real-time error rate detection will also be useful for finding position information system disturbances at a specific time zone by a defense system.

In the future, it will be possible to develop a more refined algorithm through a change in window size or a change in calibration technique (current linear interpolation). Also, it will be possible to extract a real-time error possibility more similar to the fact.

In the above-described algorithms, the significant level is set on the assumption that a speed conforms to a normal distribution. However, the speed may actually be fit to distributions other than the normal distribution. For example, when it is assumed that the speed conforms to a Reyleigh distribution, it is possible to estimate the parameter $$\partial \approx \sqrt{\frac{1}{2N}\sum_{i=1}^{N} x_i^2}$$

of the Reyleigh distribution by using a speed value x_i in a moving window with respect to a moving window size N. In addition, it is possible to actually calculate a probability value $$f(x;\sigma) = \frac{x}{\sigma^2} e^{-x^2/2\sigma^2}, x \geq 0$$

by using an estimated parameter and a probability density function (PDF). In this case, it is possible to represent a speed value by a probability variable X, and it is possible to find a moving average $$\mu(X) = \sigma\sqrt{\frac{\pi}{2}} \approx 1.253\sigma,$$

a moving standard deviation $$\text{var}(X) = \frac{4-\pi}{2}\sigma^2 \approx 0.429\sigma^2.$$

It is possible to use cumulative density function (CDF) $F(x)=1-e^{-x^2/2\sigma^2}$ for actual calculation and it is possible to find a probability value for a given parameter s, i.e., a value corresponding to "moving average+s* moving standard deviation". When solving a related equation, it is possible to find the value s satisfying the current error value from a given probability distribution. As described above, it is possible to find the parameter s for the significant level on the assumption that a speed satisfies distributions other than the normal distribution and the Reyleigh distribution.

According to the present disclosure, it is possible to filter out erroneous position data in real time, and it is possible to provide a technique of replacing, position data determined as erroneous, in real time by using corrected new position data without discarding the position data determined as erroneous.

By using embodiments of the present disclosure as described above, a person skilled in the art may easily implement various changes and modifications without departing from the essential characteristic of the present disclosure. Each of claims may be combined with another claim having no reference as long as it is possible to understand through the present disclosure.

What is claimed is:

1. A method of processing location information using values on a moving significant interval, the moving significant interval being generated in order to process information on a plurality of tuples comprising latitude, longitude, and timestamp collected from a position information collection device, by using a plurality of speed values on the plurality of tuples, the method comprising:
   calculating an error rate regarding a collected set of tuples;
   converting a significant value included in a formula for calculating a value on the moving significant interval into a comparison value for comparing with the error rate;
   changing the significant value according to a result obtained by comparing the error rate with the comparison value;
   renewing the value on the moving significant interval by using the changed significant value and tuples collected in the past; and
   determining whether a newly collected tuple has an error or not, by comparing the renewed value on the moving significant interval with the newly collected tuple.

2. The method of claim 1, wherein
the value on the moving significant interval is a value calculated using an average value of speed of the collected set of tuples, a standard deviation value of the speed of the collected set of tuples, and the significant value.

3. The method of claim 1, wherein
the changing includes:
   if the error rate is smaller than the comparison value, increasing the significant value; and
   if the error rate is larger than the comparison value, decreasing the significant value.

4. The method of claim 1, wherein,
the changing is conducted only when a whole number of collected tuples at the time of collecting the last one of the collected set of tuples is larger than a minimum sample size determined by a predefined rule, and
if the significant value is changed, the minimum sample size is converted based on the changed significant value.

5. The method of claim 1, wherein, the significant level value is based on a normal distribution or a Reyleigh distribution or exponential distribution.

6. The method of claim 1, further comprising:
   if an acceleration value $a_{i+1}$ at timestamp $t_{i+1}$ has an error, substituting an latitude $lat_{i+1}$ acquired at the timestamp $t_{i+1}$ with a corrected latitude created by applying a representative value of one or more latitude values acquired before a timestamp $t_i$ to a latitude $lat_i$ acquired at the timestamp $t_i$; substituting a longitude $lon_{i+1}$ acquired at the timestamp $t_{i+1}$ with a corrected longitude created by applying a representative value of one or more longitude values acquired before the timestamp $t_i$ to a longitude $lon_i$ acquired at the timestamp $t_i$; and
   if a tuple $P_i$ at the timestamp $t_i$ has an error, estimating an estimated latitude $lat_i$ at the timestamp $t_i$ by interpolating the corrected latitude with one or more latitudes acquired before the timestamp $t_i$ estimating an estimated longitude $lon_i$ at the timestamp $t_i$, by interpolating the corrected longitude with one or more longitudes acquired before the timestamp $t_i$.

7. The method of claim 1, further comprising:
   if a speed of the newly collected tuple is larger than a value regarding the renewed moving significant interval, determining that the newly collected tuple has an error; and
   if the newly collected tuple has an error, substituting information on the newly collected tuple with an estimated value.

8. A user device for conducting a location information process, comprising:
   a location information collecting unit configured to use values on a moving significant interval generated by using a plurality of speed values on a plurality of tuples to process information on the plurality of tuples, the plurality of tuples comprising latitude, longitude, and timestamp collected from a position information collection device; and a processing unit configured to process information of the plurality of tuples;

wherein, the processing unit is configured to conduct:

calculating an error rate regarding a collected set of tuples;

converting a significant value included in a formula for calculating the value on a moving significant interval into a comparison value for comparing with the error rate;

changing the significant value according to a result obtained by comparing the error rate with the comparison value;

renewing the value on the moving significant interval by using the changed significant value and tuples collected in the past; and determining whether a newly collected tuple has an error or not, by comparing the renewed value on the moving significant interval with the newly collected tuple.

* * * * *